(12) United States Patent
Su et al.

(10) Patent No.: US 11,943,744 B2
(45) Date of Patent: Mar. 26, 2024

(54) SIDELINK COMMUNICATION METHOD, TERMINAL DEVICE, AND NETWORK DEVICE

(71) Applicant: HUAWEI TECHNOLOGIES CO., LTD., Shenzhen (CN)

(72) Inventors: Hongjia Su, Shanghai (CN); Jun Luo, Kista (SE); Jinfang Zhang, Shenzhen (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 510 days.

(21) Appl. No.: 17/173,066

(22) Filed: Feb. 10, 2021

(65) Prior Publication Data
US 2021/0168766 A1  Jun. 3, 2021

Related U.S. Application Data

(63) Continuation of application No. PCT/CN2019/099589, filed on Aug. 7, 2019.

(30) Foreign Application Priority Data

Aug. 10, 2018 (CN) .......................... 201810914366.8

(51) Int. Cl.
*H04W 72/02* (2009.01)
*H04W 72/0453* (2023.01)
*H04W 72/20* (2023.01)

(52) U.S. Cl.
CPC ....... *H04W 72/02* (2013.01); *H04W 72/0453* (2013.01); *H04W 72/20* (2023.01)

(58) Field of Classification Search
CPC ............. H04L 27/2614; H04L 27/2636; H04L 5/0005; H04L 27/2602; H04B 1/707; H04B 1/02

(Continued)

(56) References Cited

U.S. PATENT DOCUMENTS

2014/0185530 A1  7/2014  Kuchibhotla et al.
2017/0041902 A1  2/2017  Sheng
(Continued)

FOREIGN PATENT DOCUMENTS

CN   104869526 A   8/2015
CN   107079528 A   8/2017
(Continued)

OTHER PUBLICATIONS

Intel Corporation, "On Carrier Aggregation for LTE V2V Sidelink Communication", Apr. 2, 2021, RAN WG1 (Year: 2017).*
(Continued)

*Primary Examiner* — Kwang B Yao
*Assistant Examiner* — Syed M Bokhari

(57) ABSTRACT

A sidelink communication method, a terminal device, and a network device are provided. In some embodiments, a terminal device receives resource configuration information sent by a network device, where the resource configuration information is for configuring a common resource for the terminal device, and the common resource is a resource that is configured by the network device for all terminal devices within coverage of the network device and that is to be used by all the terminal devices to perform sidelink communication. The terminal device receives sidelink BWP indication information sent by the network device, where the sidelink BWP indication information indicates N sidelink bandwidth parts SL-BWPs, and the N SL-BWPs include a frequency domain resource corresponding to the common resource, where N is a positive integer. The terminal device performs sidelink communication with another terminal device in the N SL-BWPs.

22 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0230956 A1 | 8/2017 | Kim et al. | |
| 2017/0289733 A1 | 10/2017 | Rajagopal et al. | |
| 2018/0124748 A1 | 5/2018 | Baldemair et al. | |
| 2018/0183551 A1 | 6/2018 | Chou et al. | |
| 2019/0306923 A1* | 10/2019 | Xiong | H04J 13/0062 |
| 2020/0029318 A1* | 1/2020 | Guo | H04L 1/1822 |
| 2020/0045674 A1* | 2/2020 | Tseng | H04W 76/14 |

FOREIGN PATENT DOCUMENTS

| | | |
|---|---|---|
| CN | 107733507 A | 2/2018 |
| CN | 107734693 A | 2/2018 |
| CN | 107889222 A | 4/2018 |
| CN | 110234094 A | 9/2019 |
| WO | 2017152416 A1 | 9/2017 |

OTHER PUBLICATIONS

Office Action dated Feb. 28, 2023 issued for Chinese Application No. 201810914366.8 (34 pages).
Samsung, Remaining issues on bandwidth part configuration. 3GPP Tsg-Ran WG2 NR #100 Meeting, Reno, USA, Nov. 27-Dec. 1, 2017, R2-1713868, 6 pages.
Huawei, HiSilicon, Remaining issues on bandwidth part and wideband operation. 3GPPTSGRANWG1 NR Ad Hoc Meeting, Vancouver, Canada, Jan. 22-26, 2018, R1-1800018, 14 pages.
Intel Corporation, On Carrier Aggregation for LTE V2V Sidelink Communication. 3GPP TSG RAN1 WG Meeting#88bis, Spokane, USA, Apr. 3-7, 2017, R1-1705446, 9 pages.
Extended European Search Report dated Aug. 20, 2021 issued in European Application No. 19846348.1 (10 pages).
RAN1, "Reply LS on subcarrier spacing for BWPs and TDD configurations", 3GPP TSG RAN WG1 Meeting #93 R1-1807676, Busan, Korea, May 21-May 25, 2018, total 2 pages.
3GPP TS 36.213 V15.2.0 (Jun. 2018); 3rd Generation Partnership Project; Technical Specification Group Radio Access Network; Evolved Universal Terrestrial Radio Access (E-UTRA); Physical layer procedures (Release 15); total 541 pages.
3GPP TS 36.331 V15.2.2 (Jun. 2018); 3rd Generation Partnership Project; Technical Specification Group Radio Access Network; Evolved Universal Terrestrial Radio Access (E-UTRA); Radio Resource Control (RRC); Protocol specification (Release 15); total 791 pages.
3GPP TS 38.211 V15.2.0 (Jun. 2018); 3rd Generation Partnership Project; Technical Specification Group Radio Access Network; NR; Physical channels and modulation (Release 15); total 96 pages.
3GPP TS 38.213 V15.2.0 (Jun. 2018), 3rd Generation Partnership Project; Technical Specification Group Radio Access Network; NR; Physical layer procedures for control (Release 15), total 99 pages.
3GPP TS 38.214 V15.2.0 (Jun. 2018); 3rd Generation Partnership Project; Technical Specification Group Radio Access Network; NR; Physical layer procedures for data (Release 15); total 94 pages.
3GPP TS 38.331 V15.2.1 (Jun. 2018); 3rd Generation Partnership Project; Technical Specification Group Radio Access Network; NR; Radio Resource Control (RRC) protocol specification (Release 15); total 303 pages.
Search Report issued in PCT/CN2019/099589, dated Oct. 21, 2019, total 9 pages.
Office Action dated Aug. 1, 2023, issued for Chinese Application No. 201810914366.8 (13 pages).
Intel Corporation, Details of resource pool design for sidelink V2V communication. 3GPP TSG RAN WG1 Meeting #86, Gothenburg, Sweden, Aug. 22-26, 2016, R1-166515, 8 pages.
Samsung, Framework to support bandwidth parts in Nr. 3GPP TSG-RAN WG2 NR #99bis Meeting, Prague, Czech, Oct. 9-13, 2017, R2-1711187, 8 pages.
Huawei, HiSilicon, Summary of remaining issues on bandwidth part and wideband operation. 3GPP TSG RAN WGI Meeting #92, Athens, Greece, Feb. 26-Mar. 2, 2018, R1-1801347, 13 pages.
Communication pursuant to Article 94(3) EPC dated Dec. 5, 2023 issued for European Application No. 19 846 348.1 (10 pages).

* cited by examiner

SIDELINK COMMUNICATION METHOD, TERMINAL DEVICE, AND NETWORK DEVICE

CROSS-REFERENCE TO RELATED APPLICATIONS

This application is a continuation of International Application No. PCT/CN2019/099589, filed on Aug. 7, 2019, which claims priority to Chinese Patent Application No. 201810914366.8, filed on Aug. 10, 2018. The aforementioned applications are hereby incorporated by reference in their entireties.

TECHNICAL FIELD

This application relates to the field of communications technologies, and more specifically, to a sidelink communication method, a terminal device, and a network device.

BACKGROUND

In a new radio (NR) system, to implement communication between a terminal device and a network device, the network device may configure bandwidth parts (BWP) for different terminal devices based on factors such as service requirements of the terminal devices. A BWP used for uplink (UL) communication is referred to as a UL-BWP, and a BWP used for downlink (DL) communication is referred to as a DL-BWP.

However, in the foregoing solution, when the BWPs are configured for the terminal devices, only a requirement for information transmission between the terminal devices and the network device is considered, but how to perform sidelink (SL) communication between the different terminal devices is not considered. Therefore, how to configure a BWP resource for a terminal device so that sidelink communication is performed between different terminal devices is a problem that needs to be resolved.

SUMMARY

This application provides a sidelink communication method, a terminal device, and a network device, so that the terminal device can perform sidelink communication with another terminal device on a configured frequency domain resource.

According to a first aspect, a sidelink communication method is provided. The method includes: A terminal device receives resource configuration information sent by a network device, where the resource configuration information is used to configure a common resource for the terminal device. The terminal device receives sidelink BWP indication information sent by the network device, where the sidelink BWP indication information is used to indicate N sidelink bandwidth parts SL-BWPs. The terminal device performs sidelink communication with another terminal device in the N SL-BWPs.

The common resource is a resource that is configured by the network device for all terminal devices within coverage of the network device and that is to be used by all the terminal devices to perform sidelink communication.

In addition, the N SL-BWPs are bandwidth parts BWPs that are configured for the terminal device and that are used for sidelink communication, and the N SL-BWPs include a frequency domain resource corresponding to the common resource, where N is a positive integer.

In this application, the N SL-BWPs including the frequency domain resource corresponding to the common resource are configured for the terminal device, so that the terminal device can perform sidelink communication with the another terminal device in the N SL-BWPs.

It should be understood that the another terminal device may be a terminal device different from the foregoing terminal device, at least one SL-BWP may also be configured for the another terminal device, and the at least one SL-BWP also includes the frequency domain resource corresponding to the common resource. Because both the SL-BWPs configured for the terminal device and the SL-BWP configured for the another terminal device include the frequency domain resource corresponding to the common resource, the terminal device can perform sidelink communication with the another terminal device.

In addition, there may be one or more other terminal devices. In other words, the terminal device may perform sidelink communication with the one or more other terminal devices in the N SL-BWPs.

In some embodiments, the common resource is specifically a common resource pool.

It should be understood that, that the N SL-BWPs include the frequency domain resource corresponding to the common resource may mean that at least one SL-BWP in the N SL-BWPs includes the frequency domain resource corresponding to the common resource.

In some embodiments, the common resource includes K common sub-resources, and K is a positive integer greater than 1.

For example, the common resource is configured by using the resource configuration information, and the common resource includes three common sub-resources. Assuming that the sidelink BWP indication information indicates three SL-BWPs, one SL-BWP in the three SL-BWPs may include frequency domain resources corresponding to all of the three common sub-resources, or two SL-BEPs in the three SL-BWPs may include frequency domain resources corresponding to all of the three common sub-resources, or each of the three SL-BWPs may include a frequency domain resource corresponding to one common sub-resource.

In one design, the method further includes: The terminal device receives sidelink BWP configuration information sent by the network device, where the sidelink BWP configuration information is used to configure M SL-BWPs for the terminal device.

The M SL-BWPs are BWPs available for sidelink communication, and the N SL-BWPs belong to the M SL-BWPs, where M is a positive integer greater than or equal to N.

The N SL-BWPs may be SL-BWPs activated in the configured M SL-BWPs. Further, the N SL-BWPs may be SL-BWPs that are activated in the M SL-BWPs and that include the frequency domain resource corresponding to the common resource.

In one design, the method further includes: The terminal device receives uplink BWP indication information sent by the network device, where the uplink BWP indication information is used to indicate Y uplink bandwidth parts UL-BWPs.

Y is a positive integer, and the Y UL-BWPs are UL-BWPs activated by the network device.

When configuring the SL-BWP, the network device may also configure the UL-BWP for the terminal device, so that the terminal device can perform uplink communication with the network device based on the UL-BWP.

In one design, the Y UL-BWPs and the N SL-BWPs are located on a same carrier.

The UL-BWP and the SL-BWP are configured on the same carrier, so that utilization efficiency of spectrum resources can be improved.

In one design, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In one design, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In one design, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

In one design, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

Therefore, the network device may flexibly configure sidelink resources based on a service type or another requirement, to improve system performance.

In one design, the resource configuration information carries transmission mode indication information, the transmission mode indication information is used to indicate a transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology (numerology) indication information, the numerology indication information is used to indicate a numerology used when the terminal device performs sidelink communication on the common resource, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

In one design, the resource configuration information is further used to configure a dedicated resource for the terminal device, the resource configuration information further carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In one design, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology indication information, the numerology indication information is used to indicate a numerology (numerology) used when the terminal device performs sidelink communication on the dedicated resource, and the numerology includes a subcarrier spacing (subcarrier spacing, SCS) and a cyclic prefix (cyclic prefix, CP).

In some embodiments, the dedicated resource is a dedicated resource pool.

The network device may configure dedicated resources for some terminal devices based on characteristics of sidelink communication and requirements in sidelink communication, so that the some terminal devices perform sidelink communication by using the configured dedicated resources, thereby improving system performance.

For example, when a high-reliability sidelink communication service needs to be performed between terminal devices, a dedicated resource may be configured for the terminal devices, so that the terminal devices can perform sidelink communication on the dedicated resource, to ensure reliability of the sidelink communication.

According to a second aspect, a sidelink communication method is provided, where the method includes: A network device sends resource configuration information to a terminal device, where the resource configuration information is used to configure a common resource for the terminal device. The network device sends sidelink BWP indication information to the terminal device, where the sidelink BWP indication information is used to indicate N sidelink bandwidth parts SL-BWPs, and the N SL-BWPs are used by the terminal device to perform sidelink communication with another terminal device, where N is a positive integer.

The common resource is a resource that is configured by the network device for all terminal devices within coverage of the network device and that is to be used by all the terminal devices to perform sidelink communication.

In addition, the N SL-BWPs are bandwidth parts BWPs that are configured for the terminal device and that are used for sidelink communication, and the N SL-BWPs include a frequency domain resource corresponding to the common resource, where N is a positive integer.

In this application, the network device configures the N SL-BWPs including the frequency domain resource corresponding to the common resource for the terminal device, so that the terminal device can perform sidelink communication with the another terminal device in the N SL-BWPs.

It should be understood that the another terminal device may be a terminal device different from the foregoing terminal device, at least one SL-BWP may also be configured for the another terminal device, and the at least one SL-BWP also includes the frequency domain resource corresponding to the common resource. Because both the SL-BWPs configured for the terminal device and the SL-BWP configured for the another terminal device include the frequency domain resource corresponding to the common resource, the terminal device can perform sidelink communication with the another terminal device.

In addition, there may be one or more other terminal devices. In other words, the terminal device may perform sidelink communication with the one or more other terminal devices in the N SL-BWPs.

In some embodiments, the common resource is specifically a common resource pool.

In one design, the method further includes: The network device sends sidelink BWP configuration information to the terminal device, where the sidelink BWP configuration information is used to configure M SL-BWPs for the terminal device.

The M SL-BWPs are BWPs available for sidelink communication, and the N SL-BWPs belong to the M SL-BWPs, where M is a positive integer greater than or equal to N.

The N SL-BWPs may be SL-BWPs activated in the configured M SL-BWPs. Further, the N SL-BWPs may be SL-BWPs that are activated in the M SL-BWPs and that include the frequency domain resource corresponding to the common resource.

In one design, the method further includes: The network device sends uplink BWP indication information to the terminal device, where the uplink BWP indication information is used to indicate Y uplink bandwidth parts UL-BWPs.

Y is a positive integer, and the Y UL-BWPs are UL-BWPs activated by the network device.

When configuring the SL-BWP, the network device may also configure the UL-BWP for the terminal device, so that the terminal device can perform uplink communication with the network device based on the UL-BWP.

In one design, the Y UL-BWPs and the N SL-BWPs are located on a same carrier.

The UL-BWP and the SL-BWP are configured on the same carrier, so that utilization efficiency of spectrum resources can be improved.

In one design, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In one design, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In one design, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

In one design, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In one design, the resource configuration information carries transmission mode indication information, the transmission mode indication information is used to indicate a transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology (numerology) indication information, the numerology indication information is used to indicate a numerology used when the terminal device performs sidelink communication on the common resource, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

In one design, the resource configuration information is further used to configure a dedicated resource for the terminal device, the resource configuration information further carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In one design, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology indication information, the numerology indication information is used to indicate a numerology (numerology) used when the terminal device performs sidelink communication on the dedicated resource, and the numerology includes a subcarrier spacing (subcarrier spacing, SCS) and a cyclic prefix (cyclic prefix, CP).

In some embodiments, the dedicated resource is specifically a dedicated resource pool.

The network device may configure dedicated resources for some terminal devices based on characteristics of sidelink communication and requirements in sidelink communication, so that the some terminal devices perform sidelink communication by using the configured dedicated resources, thereby improving system performance.

According to a third aspect, a sidelink communication method is provided. The method includes: A terminal device receives resource configuration information sent by a network device, where the resource configuration information is used to configure a common resource for the terminal device. The terminal device receives uplink BWP indication information sent by the network device, where the uplink BWP indication information is used to indicate Y UL-BWPs, and the Y UL-BWPs include a frequency domain resource corresponding to the common resource, where Y is a positive integer. The terminal device performs sidelink communication with another terminal device in the Y UL-BWPs.

The common resource is a resource that is configured by the network device for all terminal devices within coverage of the network device and that is to be used by all the terminal devices to perform sidelink communication.

In some embodiments, the common resource is specifically a common resource pool.

In this application, the Y UL-BWPs including the frequency domain resource corresponding to the common resource are configured for the terminal device, so that the terminal device can perform sidelink communication with the another terminal device by using the Y UL-BWPs.

The another terminal device may be a terminal device different from the foregoing terminal device, at least one UL-BWP may also be configured for the another terminal device, and the at least one UL-BWP also includes the frequency domain resource corresponding to the common resource. Because both the UL-BWPs configured for the terminal device and the UL-BWP configured for the another terminal device include the frequency domain resource corresponding to the common resource, the terminal device can perform sidelink communication with the another terminal device.

There may be one or more other terminal devices. In other words, the terminal device may perform sidelink communication with the one or more other terminal devices in the Y UL-BWPs.

It should be understood that, that the Y UL-BWPs include the frequency domain resource corresponding to the common resource may mean that at least one UL-BWP in the Y UL-BWPs includes the frequency domain resource corresponding to the common resource.

In some embodiments, the common resource includes K common sub-resources, and K is a positive integer greater than 1.

For example, the common resource is configured by using the resource configuration information, and the common resource includes three common sub-resources. Assuming that the sidelink BWP indication information indicates three UL-BWPs, only one UL-BWP in the three UL-BWPs may include frequency domain resources corresponding to all of the three common sub-resources, or two UL-BEPs in the three UL-BWPs may include frequency domain resources corresponding to all of the three common sub-resources, or each of the three UL-BWPs may include a frequency domain resource corresponding to one common sub-resource.

In one design, the method further includes: The terminal device receives uplink BWP configuration information sent by the network device, where the uplink BWP configuration information is used to configure X UL-BWPs for the terminal device.

The Y UL-BWPs belong to the X UL-BWPs, and X is a positive integer greater than or equal to Y. The Y UL-BWPs may be BWPs activated by the network device in the X UL-BWPs.

In one design, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In one design, the resource configuration information carries transmission mode indication information, the transmission mode indication information is used to indicate a transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology (numerology) indication information, the numerology indication information is used to indicate a numerology used when the terminal device performs sidelink communication on the common resource, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

In one design, the resource configuration information is further used to configure a dedicated resource for the terminal device, the resource configuration information further carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In one design, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology (numerology) indication information, the numerology indication information is used to indicate a numerology used when the terminal device performs sidelink communication on the dedicated resource, and the numerology includes a subcarrier spacing (subcarrier spacing, SCS) and a cyclic prefix (cyclic prefix, CP).

In some embodiments, the dedicated resource is specifically a dedicated resource pool.

The network device may configure dedicated resources for some terminal devices based on characteristics of sidelink communication and requirements in sidelink communication, so that some terminal devices perform sidelink communication by using the configured dedicated resources, thereby improving system performance.

According to a fourth aspect, a sidelink communication method is provided. The method includes: A network device sends resource configuration information to a terminal device, where the resource configuration information is used to configure a common resource for the terminal device. The network device sends uplink BWP indication information to the terminal device, where the uplink BWP indication information is used to indicate Y UL-BWPs, the Y UL-BWPs include a frequency domain resource corresponding to the common resource, and the Y UL-BWPs are used by the terminal device to perform sidelink communication with another terminal device, where Y is a positive integer.

The common resource is a resource that is configured by the network device for all terminal devices within coverage of the network device and that is to be used by all the terminal devices to perform sidelink communication.

In some embodiments, the common resource is specifically a common resource pool.

In this application, the network device configures the Y SL-BWPs including the frequency domain resource corresponding to the common resource for the terminal device, so that the terminal device can perform sidelink communication with the another terminal device by reusing the Y UL-BWPs.

The another terminal device may be a terminal device different from the foregoing terminal device, at least one UL-BWP may also be configured for the another terminal device, and the at least one UL-BWP also includes the frequency domain resource corresponding to the common resource. Because both the UL-BWPs configured for the terminal device and the UL-BWP configured for the another terminal device include the frequency domain resource corresponding to the common resource, the terminal device can perform sidelink communication with the another terminal device.

There may be one or more other terminal devices. In other words, the terminal device may perform sidelink communication with the one or more other terminal devices in the Y UL-BWPs.

In one design, the method further includes: The network device sends uplink BWP configuration information to the terminal device, where the uplink BWP configuration information is used to configure X UL-BWPs for the terminal device.

The Y UL-BWPs belong to the X UL-BWPs, and X is a positive integer greater than or equal to Y. The Y UL-BWPs may be BWPs activated by the network device in the X UL-BWPs.

In one design, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In one design, the resource configuration information carries transmission mode indication information, the transmission mode indication information is used to indicate a transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology (numerology) indication information, the numerology indication information is used to indicate a numerology used when the terminal device performs sidelink communication on the common resource, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

In one design, the resource configuration information is further used to configure a dedicated resource for the terminal device, the resource configuration information further carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In one design, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the resource configuration information further carries numerology (numerology) indication information, the numerology indication information is used to indicate a numerology used when the terminal device performs sidelink communication on the dedicated resource, and the numerology includes a subcarrier spacing (subcarrier spacing, SCS) and a cyclic prefix (cyclic prefix, CP).

According to a fifth aspect, a sidelink communication method is provided. The method includes: A terminal device receives sidelink BWP indication information sent by a network device, where the sidelink BWP indication information is used to indicate N sidelink bandwidth parts SL-BWPs. The terminal device performs sidelink communication with another terminal device in the N SL-BWPs.

The N SL-BWPs are bandwidth parts BWPs used by the terminal device to perform sidelink communication, the N SL-BWPs include a common SL-BW, and the common SL-BWP is a frequency domain resource that is configured by the network device for all terminal devices within coverage of the network device and that is to be used by all the terminal devices to perform sidelink communication.

In this application, the N SL-BWPs including the common SL-BWP are configured for the terminal device, so that the terminal device can perform sidelink communication with the another terminal device in the N SL-BWPs.

It should be understood that the another terminal device may be a terminal device different from the foregoing terminal device, at least one SL-BWP may also be configured for the another terminal device, and the at least one SL-BWP also includes the common SL-BWP. Because both the SL-BWPs configured for the terminal device and the SL-BWP configured for the another terminal device include the common SL-BWP, the terminal device can perform sidelink communication with the another terminal device.

In addition, there may be one or more other terminal devices. In other words, the terminal device may perform sidelink communication with the one or more other terminal devices in the N SL-BWPs.

In one design, the method further includes: The terminal device receives sidelink BWP configuration information sent by the network device, where the sidelink BWP configuration information is used to configure M SL-BWPs for the terminal device.

The M SL-BWPs are BWPs available for sidelink communication, and the N SL-BWPs belong to the M SL-BWPs, where M is a positive integer greater than or equal to N. Further, the N SL-BWPs may be SL-BWPs activated by the network device in the M SL-BWPs.

In one design, the method further includes: The terminal device receives uplink BWP indication information sent by the network device, where the uplink BWP indication information is used to indicate Y uplink bandwidth parts UL-BWPs, and Y is a positive integer. The Y UL-BWPs are UL-BWPs activated by the network device.

In one design, the Y UL-BWPs and the N SL-BWPs are located on a same carrier.

The UL-BWP and the SL-BWP are configured on the same carrier, so that utilization efficiency of spectrum resources can be improved.

In one design, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In one design, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In one design, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

In one design, the sidelink BWP configuration information carries M pieces of multiplexing format information, the M pieces of multiplexing format information are in a one-to-one correspondence with the M SL-BWPs, any one piece of multiplexing format information is used to indicate a multiplexing format of sidelink data and sidelink control information that are sent when sidelink communication is performed by using an SL-BWP corresponding to the multiplexing format information, and the multiplexing format available for the sidelink data and the sidelink control information includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In one design, the sidelink BWP configuration information carries M pieces of transmission mode information, the M pieces of transmission mode information are in a one-to-one correspondence with the M SL-BWPs, any one piece of transmission mode information is used to indicate a transmission mode of sidelink data and sidelink control information that are sent when sidelink communication is performed by using an SL-BWP corresponding to the transmission mode information, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, in one design, the sidelink BWP configuration information carries M pieces of numerology (numerology) information, the M pieces of numerology information are in a one-to-one correspondence with the M SL-BWPs, any one piece of numerology information is used to indicate a numerology of sidelink data and sidelink control information that are sent when sidelink communication is performed by using an SL-BWP corresponding to the numerology information, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

In one design, the sidelink BWP configuration information is further used to configure a dedicated resource for the terminal device, the resource configuration information further carries multiplexing format indication information, the multiplexing format indication information is used to indicate a multiplexing format of sidelink data and sidelink control information that are sent by the terminal device when the terminal device performs sidelink communication by using the M SL-BWPs, and the multiplexing format includes frequency division multiplexing and time division multiplexing.

In one design, the sidelink BWP configuration information further carries transmission mode indication information, the transmission mode indication information is used to indicate a transmission mode used when the terminal device performs sidelink communication by using the M SL-BWPs, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, the sidelink BWP configuration information further carries numerology indication information, the numerology indication information is used to indicate a numerology (numerology) used when the terminal device performs sidelink communication by using the M SL-BWPs, and the numerology includes a subcarrier spacing (subcarrier spacing, SCS) and a cyclic prefix (cyclic prefix, CP).

In some embodiments, the dedicated resource is specifically a dedicated resource pool.

The network device may configure dedicated resources for some terminal devices based on characteristics of sidelink communication and requirements in sidelink communication, so that the some terminal devices perform sidelink communication by using the configured dedicated resources, thereby improving system performance.

For example, when a high-reliability sidelink communication service needs to be performed between terminal devices, a dedicated resource may be configured for the terminal devices, so that the terminal devices can perform sidelink communication on the dedicated resource, to ensure reliability of the sidelink communication.

According to a sixth aspect, a sidelink communication method is provided. The method includes: A network device generates sidelink BWP indication information, where the sidelink BWP indication information is used to indicate N sidelink bandwidth parts SL-BWPs. The network device sends the sidelink BWP indication information to a terminal device, where the N SL-BWPs are used by the terminal device to perform sidelink communication with another terminal device.

The N SL-BWPs are bandwidth parts BWPs used by the terminal device to perform sidelink communication, the N SL-BWPs include a common SL-BW, and the common SL-BWP is a frequency domain resource that is configured by the network device for all terminal devices within coverage of the network device and that is to be used by all the terminal devices to perform sidelink communication.

In this application, the network device configures the N SL-BWPs including the common SL-BWP for the terminal device, so that the terminal device can perform sidelink communication with the another terminal device in the N SL-BWPs.

In addition, there may be one or more other terminal devices. In other words, the terminal device may perform sidelink communication with the one or more other terminal devices in the N SL-BWPs.

In one design, the method further includes: The network device sends sidelink BWP configuration information to the terminal device, where the sidelink BWP configuration information is used to configure M SL-BWPs for the terminal device.

The M SL-BWPs are BWPs available for sidelink communication, and the N SL-BWPs belong to the M SL-BWPs, where M is a positive integer greater than or equal to N. Further, the N SL-BWPs may be SL-BWPs activated by the network device in the M SL-BWPs.

In one design, the network device sends uplink BWP indication information to the terminal device, where the uplink BWP indication information is used to indicate Y uplink bandwidth parts UL-BWPs, and Y is positive integer.

In one design, the Y UL-BWPs and the N SL-BWPs are located on a same carrier.

The UL-BWP and the SL-BWP are configured on the same carrier, so that utilization efficiency of spectrum resources can be improved.

In one design, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In one design, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In one design, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

In one design, the sidelink BWP configuration information carries M pieces of multiplexing format information, the M pieces of multiplexing format information are in a one-to-one correspondence with the M SL-BWPs, any one piece of multiplexing format information is used to indicate a multiplexing format of sidelink data and sidelink control information that are sent when sidelink communication is performed by using an SL-BWP corresponding to the multiplexing format information, and the multiplexing format available for the sidelink data and the sidelink control information includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In one design, the sidelink BWP configuration information carries M pieces of transmission mode information, the M pieces of transmission mode information are in a one-to-one correspondence with the M SL-BWPs, any one piece of transmission mode information is used to indicate a transmission mode of sidelink data and sidelink control information that are sent when sidelink communication is performed by using an SL-BWP corresponding to the transmission mode information, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In one design, in one design, the sidelink BWP configuration information carries M pieces of numerology (numerology) information, the M pieces of numerology information are in a one-to-one correspondence with the M SL-BWPs, any one piece of numerology information is used to indicate a numerology of sidelink data and sidelink control information that are sent when sidelink communication is performed by using an SL-BWP corresponding to the numerology information, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

According to a seventh aspect, a terminal device is provided. The terminal-side device includes a module configured to perform the method in any one of the first aspect, the third aspect, the fifth aspect, or the possible designs of the first aspect, the third aspect, and the fifth aspect.

According to an eighth aspect, a terminal device is provided. The terminal-side device includes a module configured to perform the method in any one of the second aspect, the fourth aspect, the sixth aspect, or the possible designs of the second aspect, the fourth aspect, and the sixth aspect.

According to a ninth aspect, a terminal device is provided, and includes a memory, a transceiver, and a processor. The memory is configured to store a program. The processor is configured to execute the program. When the program is executed, the processor and the transceiver perform the method in any one of the first aspect, the third aspect, the fifth aspect, or the possible designs of the first aspect, the third aspect, and the fifth aspect.

According to a tenth aspect, a network device is provided, and includes a memory, a transceiver, and a processor. The memory is configured to store a program. The processor is configured to execute the program. When the program is executed, the processor and the transceiver perform the method in any one of the second aspect, the fourth aspect, the sixth aspect, or the possible designs of the second aspect, the fourth aspect, and the sixth aspect.

According to an eleventh aspect, a computer-readable storage medium is provided. The computer-readable medium stores program code to be executed by a device. The program code includes a module configured to perform the method in any one of the first aspect, the third aspect, the fifth aspect, or the possible designs of the first aspect, the third aspect, and the fifth aspect.

According to a twelfth aspect, a computer-readable storage medium is provided. The computer-readable medium stores program code to be executed by a device. The program code includes a module configured to perform the method in any one of the second aspect, the fourth aspect, the sixth aspect, or the possible designs of the second aspect, the fourth aspect, and the sixth aspect.

According to a thirteenth aspect, a chip is provided. The chip includes a processor and a communications interface. The processor and the communications interface are configured to perform the method in any one of the first aspect, the third aspect, the fifth aspect, or the possible designs of the first aspect, the third aspect, and the fifth aspect.

In one design, the communications interface is a transceiver.

In one design, the chip is integrated into a terminal device.

According to a fourteenth aspect, a chip is provided. The chip includes a processor and a communications interface. The processor and the communications interface are configured to perform the method in any one of the second aspect, the fourth aspect, the sixth aspect, or the possible designs of the second aspect, the fourth aspect, and the sixth aspect.

In one design, the communications interface is a transceiver.

In one design, the chip is integrated into a network device.

DESCRIPTION OF EMBODIMENTS

The following describes technical solutions of this application with reference to accompanying drawings.

The technical solutions in the embodiments of this application may be applied to a plurality of communications systems, for example, a 5th generation (5th Generation, 5G) system, a new radio (NR) system, or a communications system that has a same architecture as the 5G system.

A terminal device in this application may also be referred to as a terminal, user equipment (UE), a mobile station (MS), a mobile terminal (MT), or the like. The terminal device herein may be specifically a mobile phone, a tablet (pad), a computer having a wireless transceiver function, a virtual reality (VR) terminal device, an augmented reality (AR) terminal device, a wireless terminal in industrial control, a wireless terminal in self driving, a wireless terminal in remote surgery, a wireless terminal in a smart grid, a wireless terminal in transportation safety, a wireless terminal in a smart city (smart city), a wireless terminal in a smart home, or a vehicle, a vehicle-mounted device, or a vehicle-mounted module in an internet of vehicles system.

A network device in this application may be an access device accessed by a terminal device in the mobile communications system in a wireless manner, or may be a base station NodeB, an evolved NodeB (eNodeB), a transmission reception point (TRP), a next-generation NodeB (gNB) in a 5G mobile communications system, a base station in a future mobile communications system, or an access node in a wireless fidelity (WiFi) system, or may be a radio controller in a cloud radio access network (CRAN) scenario, or a roadside unit (RSU) in an internet of vehicles system, or may be a relay station, a network device in a future evolved PLMN network, or the like.

Figure 1:
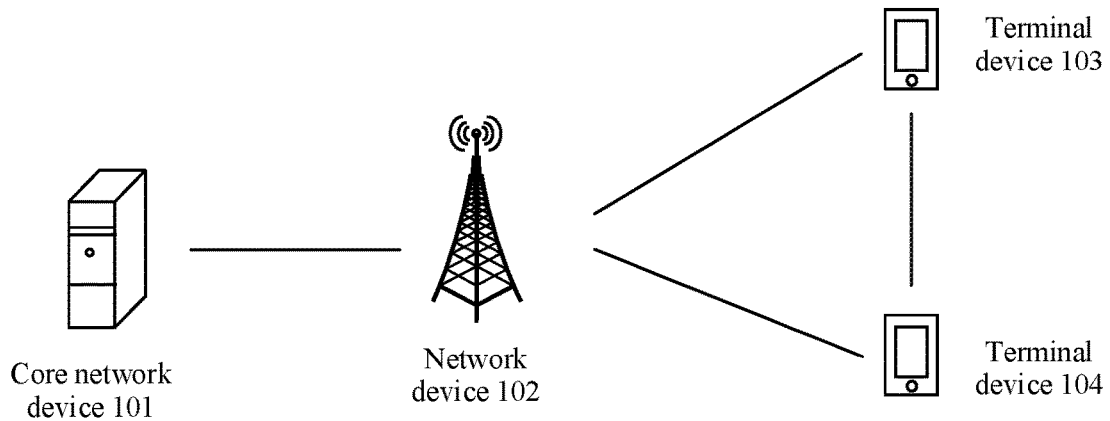
FIG. 1 is a schematic architectural diagram of a mobile communications system to which an embodiment of this application is applied.

FIG. 1 is a schematic architectural diagram of a mobile communications system to which an embodiment of this application is applied.

The mobile communications system shown in FIG. 1 includes a core network device 101, a network device 102, a terminal device 103, and a terminal device 104 (where the two terminal devices are shown in FIG. 1). The terminal device 103 and the terminal device 104 may be connected to the network device 102 in a wireless manner. The network device 102 may be connected to the core network device 101 in a wireless or wired manner. The core network device 101 and the network device 102 may be different physical devices independent of each other, or functions of the core network device 101 and logical functions of the network device 102 may be integrated into a same physical device, or some functions of the core network device 101 and some functions of the network device 102 may be integrated into one physical device. The terminal device may be in a fixed position, or may be movable.

It should be understood that the network device 102 may be an access network device.

In the system shown in FIG. 1, in addition to normal communication with the network device 102, the terminal device 103 may further perform sidelink communication with the terminal device 104.

It should be understood that FIG. 1 is only a schematic diagram of the mobile communications system according to this embodiment of this application, and the mobile communications system may further include another device. For example, the mobile communications system shown in FIG. 1 may further include a wireless relay device and a wireless backhaul device (not shown in FIG. 1). Quantities of core network devices, network devices, and terminal devices included in the mobile communications system are not limited in this embodiment of this application.

It should be understood that FIG. 1 is only a schematic diagram of the mobile communications system to which this embodiment of this application may be applied to. This embodiment of this application may be further applied to another mobile communications system that can implement communication between a network device and a terminal device. A specific form of the mobile communications system that can be applied to is not limited in this embodiment of this application.

As used herein, sidelink communication may also be referred to as sidelink communication (which may be briefly referred to as SL communication).

Figure 2:
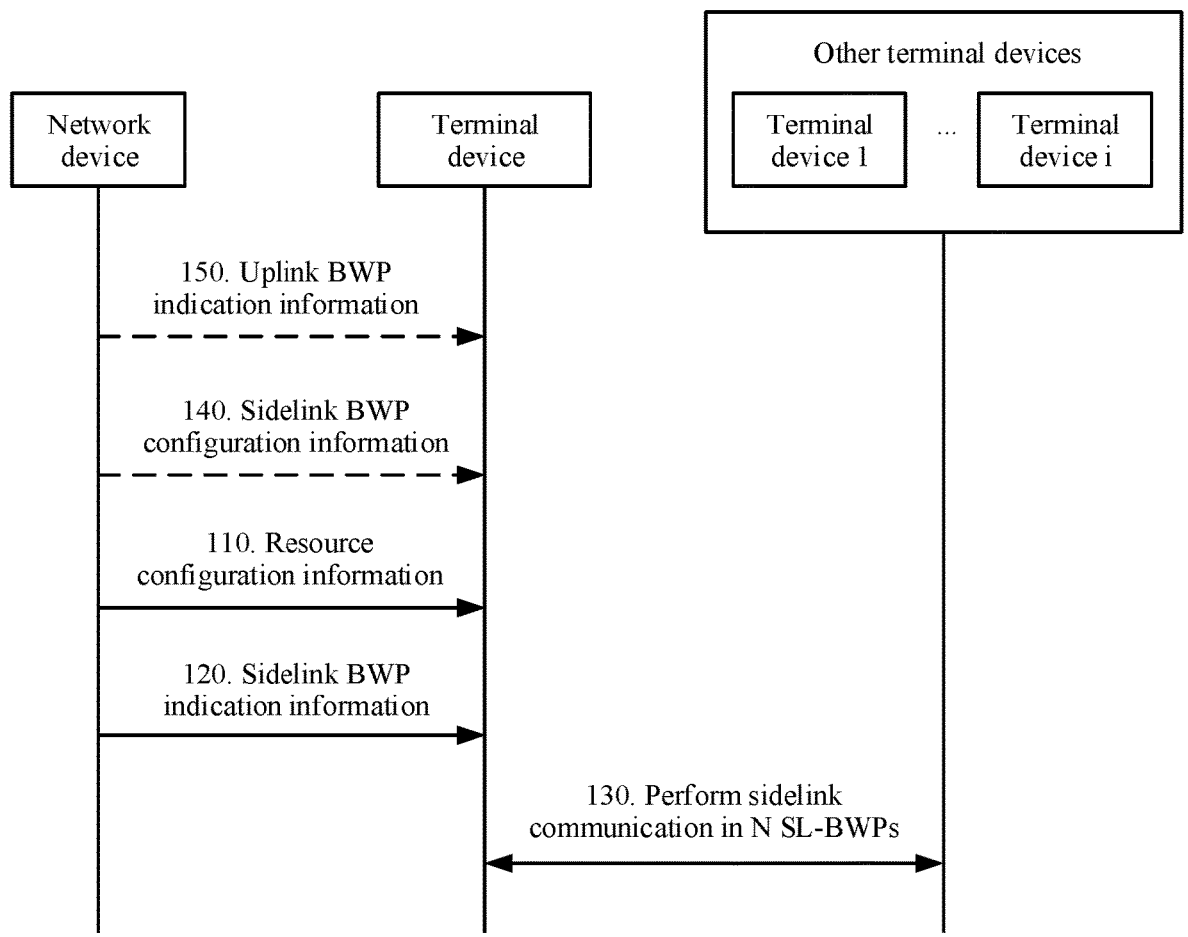
FIG. 2 is a schematic flowchart of a sidelink communication method according to an embodiment of this application.

FIG. 2 is a schematic flowchart of a sidelink communication method according to an embodiment of this application. The method shown in FIG. 2 may be performed by a terminal device. The method shown in FIG. 2 includes step 110 to step 130. The following describes step 110 to step 130 in detail.

110. A network device sends resource configuration information to a terminal device, and the terminal device receives the resource configuration information.

The resource configuration information may be used to configure a common resource for the terminal device. The common resource is a resource that is configured by the network device for all terminal devices within coverage of the network device and that is to be used by all the terminal devices to perform sidelink communication.

In other words, the common resource is a time-frequency resource configured by the network device for all the terminal devices within the coverage of the network device, and all the terminal devices within the coverage of the network device need to use the common resource to perform sidelink communication.

120. The network device sends sidelink BWP indication information to the terminal device, and the terminal device receives the sidelink BWP indication information.

The sidelink BWP indication information is used to indicate N sidelink bandwidth parts SL-BWPs, the N SL-BWPs are bandwidth parts BWPs used by the terminal device to perform sidelink communication, and the N SL-BWPs include a frequency domain resource corresponding to the common resource, where N is a positive integer.

Further, the sidelink BWP indication information may alternatively be activation information sent by the network device. The activation information may be carried in radio resource control (RRC) signaling, and the activation information is used to activate the N SL-BWPs, to obtain activated N SL-BWPs. The activated N SL-BWPs may be used for subsequent sidelink communication.

The common resource may be a common resource pool.

In some embodiments, that the N SL-BWPs include the frequency domain resource corresponding to the common resource may mean that at least one SL-BWP in the N SL-BWPs includes the frequency domain resource corresponding to the common resource.

The common resource may include K common sub-resources, where K is a positive integer greater than 1.

For example, the network device configures the common resource for the terminal device by using the resource configuration information, and the common resource includes three common sub-resources. Assuming that the sidelink BWP indication information indicates three SL-BWPs, one SL-BWP in the three SL-BWPs may include frequency domain resources corresponding to all of the three common sub-resources, or two SL-BEPs in the three SL-BWPs may include frequency domain resources corresponding to all of the three common sub-resources, or each of the three SL-BWPs may include a frequency domain resource corresponding to one common sub-resource.

130. The terminal device performs sidelink communication with another terminal device in the N SL-BWPs.

As shown in FIG. 2, the another terminal device may include at least one terminal device such as a terminal device 1 to a terminal device i (where i is a positive integer). In other words, in the method shown in FIG. 2, the terminal device may perform sidelink communication with one or more other terminal devices in the N SL-BWPs. The sidelink communication may be that the terminal device sends sidelink control information and/or sidelink data to the another terminal device, or may be that the terminal device receives sidelink acknowledgement information or sidelink feedback information from the another terminal device.

In this application, the N SL-BWPs are configured for the terminal device, and the configured N SL-BWPs include the frequency domain resource corresponding to the common resource, so that the terminal device can perform sidelink communication with the another terminal device in the N SL-BWPs.

In some embodiments, the method shown in FIG. 2 further includes step 140. It should be understood that step 140 may occur after step 110. The following describes step 140 in detail.

140. The network device sends sidelink BWP configuration information to the terminal device, and the terminal device receives the sidelink BWP configuration information.

The sidelink BWP configuration information is used to configure M SL-BWPs for the terminal device, the M SL-BWPs are BWPs available for sidelink communication, and the N SL-BWPs belong to the M SL-BWPs, where M is a positive integer greater than or equal to N.

The N SL-BWPs may be SL-BWPs activated in the configured M SL-BWPs. Further, the N SL-BWPs may be SL-BWPs that are activated in the M SL-BWPs and that include the frequency domain resource corresponding to the common resource.

In some embodiments, the method shown in FIG. 2 further includes step 150. It should be understood that step 150 may occur before step 140, or may occur after step 140, or step 150 and step 140 may occur simultaneously.

A sequence of step 110 to step 150 is not strictly limited in this application, provided that the sequence of these steps complies with communication logic and sidelink communication can be normally performed. The following describes step 150 in detail.

150. The network device sends uplink BWP indication information to the terminal device, and the terminal device receives the uplink BWP indication information.

The uplink BWP indication information is used to indicate Y uplink bandwidth parts UL-BWPs, and Y is a positive integer.

When configuring the SL-BWP, the UL-BWP may also be configured for the terminal device, so that the terminal device can communicate with the network device based on the UL-BWP.

It should be understood that the Y UL-BWPs and the N SL-BWPs may be located on a same carrier, or may be located on different carriers. In addition, when the Y UL-BWPs and the N SL-BWPs are located on a same carrier, some resources of the Y UL-BWPs may be reused in the N SL-BWPs.

Figure 4:
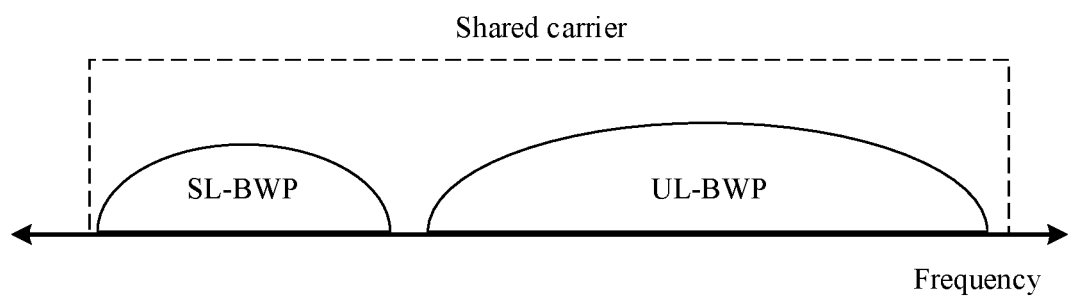
FIG. 4 is a schematic diagram of a carrier on which a UL-BWP and an SL-BWP are located.
Figure 5:
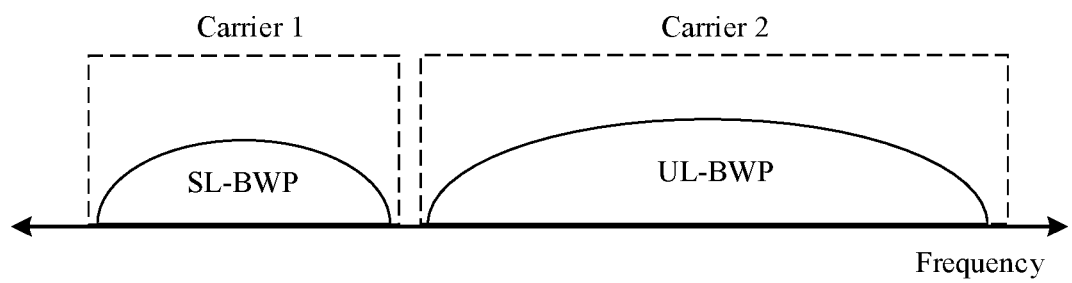
FIG. 5 is a schematic diagram of carriers on which a UL-BWP and an SL-BWP are located.

Distribution of an SL-BWP and a UL-BWP on a carrier is described in detail below with reference to FIG. 3 to FIG. 5. It should be understood that the SL-BWP shown in FIG. 3 to FIG. 5 refers to the N SL-BWPs, and the UL-BWP shown in FIG. 3 to FIG. 5 refers to the Y UL-BWPs. For brevity, when the Y UL-BWPs and the N SL-BWPs are described below with reference to FIG. 3 to FIG. 5, the UL-BWP shown in FIG. 3 to FIG. 5 is used to represent the Y UL-BWPs, and the SL-BWP shown in FIG. 3 to FIG. 5 is used to represent the N SL-BWPs.

Figure 3:
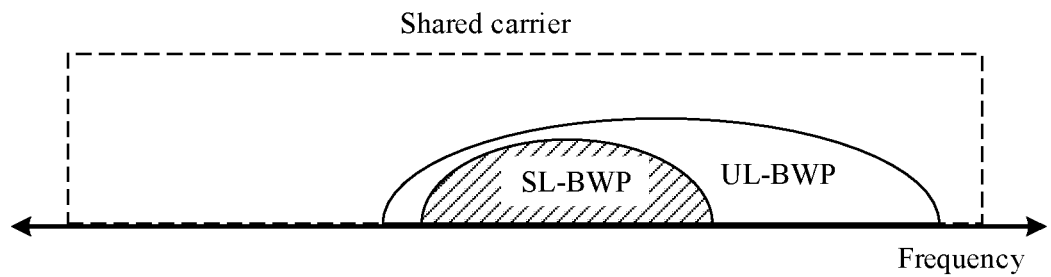
FIG. 3 is a schematic diagram of a carrier on which a UL-BWP and an SL-BWP are located.

As shown in FIG. 3, an SL-BWP and a UL-BWP are located on a same carrier (where the SL-BWP and the UL-BWP are located on a shared carrier), and a frequency domain resource occupied by the SL-BWP is a subset of a frequency domain resource occupied by the UL-BWP.

The UL-BWP and the SL-BWP are configured on the same carrier, so that utilization efficiency of spectrum resources can be improved.

It should be understood that when the UL-BWP and the SL-BWP are located on the same carrier, the frequency domain resource occupied by the UL-BWP may only be partially the same as the frequency domain resource occupied by the SL-BWP.

As shown in FIG. 4, an SL-BWP and a UL-BWP are located on a same carrier, but the SL-BWP and the UL-BWP include different frequency domain resources. In this case, sidelink communication and uplink communication may be completely independent, and do not interfere with each other.

As shown in FIG. 5, an SL-BWP is located on a carrier 1, and a UL-BWP is located on a carrier 2.

The UL-BWP and the SL-BWP are configured on the different carriers, so that sidelink communication and uplink communication that is between a terminal device and a network device can be performed on the different carriers, thereby avoiding mutual interference between the sidelink communication and the uplink communication.

In some embodiments, in an embodiment, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

The network device configures the multiplexing format for the common resource, so that requirements in sidelink communication of different services of the terminal device can be met. The network device may flexibly configure sidelink resources based on a service type or another requirement, to improve system performance.

It should be understood that, in addition to carrying the multiplexing format indication information, the resource configuration information may further carry transmission mode indication information and numerology (numerology) indication information, to indicate a transmission mode and a numerology that are used when sidelink communication is performed on the common resource.

In some embodiments, the resource configuration information carries the transmission mode indication information, the transmission mode indication information is used to indicate the transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the resource configuration information carries the numerology indication information, the numerology indication information is used to indicate the numerology (numerology) used when the terminal device performs sidelink communication on the common resource, and the numerology includes a subcarrier spacing (SCS) and a cyclic prefix (CP).

The network device may flexibly configure numerologies based on different requirements in sidelink communication, to further flexibly configure sidelink resources, thereby improving an effect of sidelink communication.

It should be understood that sidelink communication may be performed between terminal devices on the common resource. In some cases, some terminal devices have a relatively high requirement on service reliability, or have a relatively high requirement on data confidentiality in sidelink communication. In this case, a dedicated resource may be configured for some terminal devices, so that these terminal devices perform sidelink communication on the dedicated resource.

Therefore, in addition to configuring the common resource for the terminal device by using the resource configuration information, the network device may further configure a dedicated resource for the terminal device by using the resource configuration information.

In some embodiments, the resource configuration information is further used to configure the dedicated resource for the terminal device, the resource configuration information carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In some embodiments, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

Therefore, the network device can flexibly configure sidelink resources based on different requirements in sidelink communication, so that an effect of sidelink communication can be improved, and system performance can be improved.

In some embodiments, the resource configuration information further carries numerology indication information, the numerology indication information is used to indicate a numerology used when the terminal device performs sidelink communication on the dedicated resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication.

The dedicated resource may be specifically a dedicated resource pool.

The network device may configure dedicated resources for some terminal devices based on characteristics of sidelink communication and requirements in sidelink communication, so that the some terminal devices perform sidelink communication by using the configured dedicated resources, thereby improving system performance.

In some embodiments, when the network device configures the dedicated resource for the terminal device by using the resource configuration information, the resource configuration information may further carry multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

The network device configures the multiplexing format for the dedicated resource, so that requirements in sidelink communication of different services of the terminal device can be met.

The foregoing describes the sidelink communication method in the embodiments of this application in detail with reference to FIG. 2 to FIG. 5. To better understand the sidelink communication method in the embodiments of this application, the following describes in detail a process of performing sidelink communication between a terminal device 1 and a terminal device 2 with reference to an example 1 (corresponding to FIG. 6 to FIG. 8).

In the example 1, the network device configures an SL-BWP including a common resource for the terminal devices, where the common resource may be a common resource pool, so that the terminal devices can perform sidelink communication by using a resource pool of the SL-BWP including the common resource.

Figure 6:
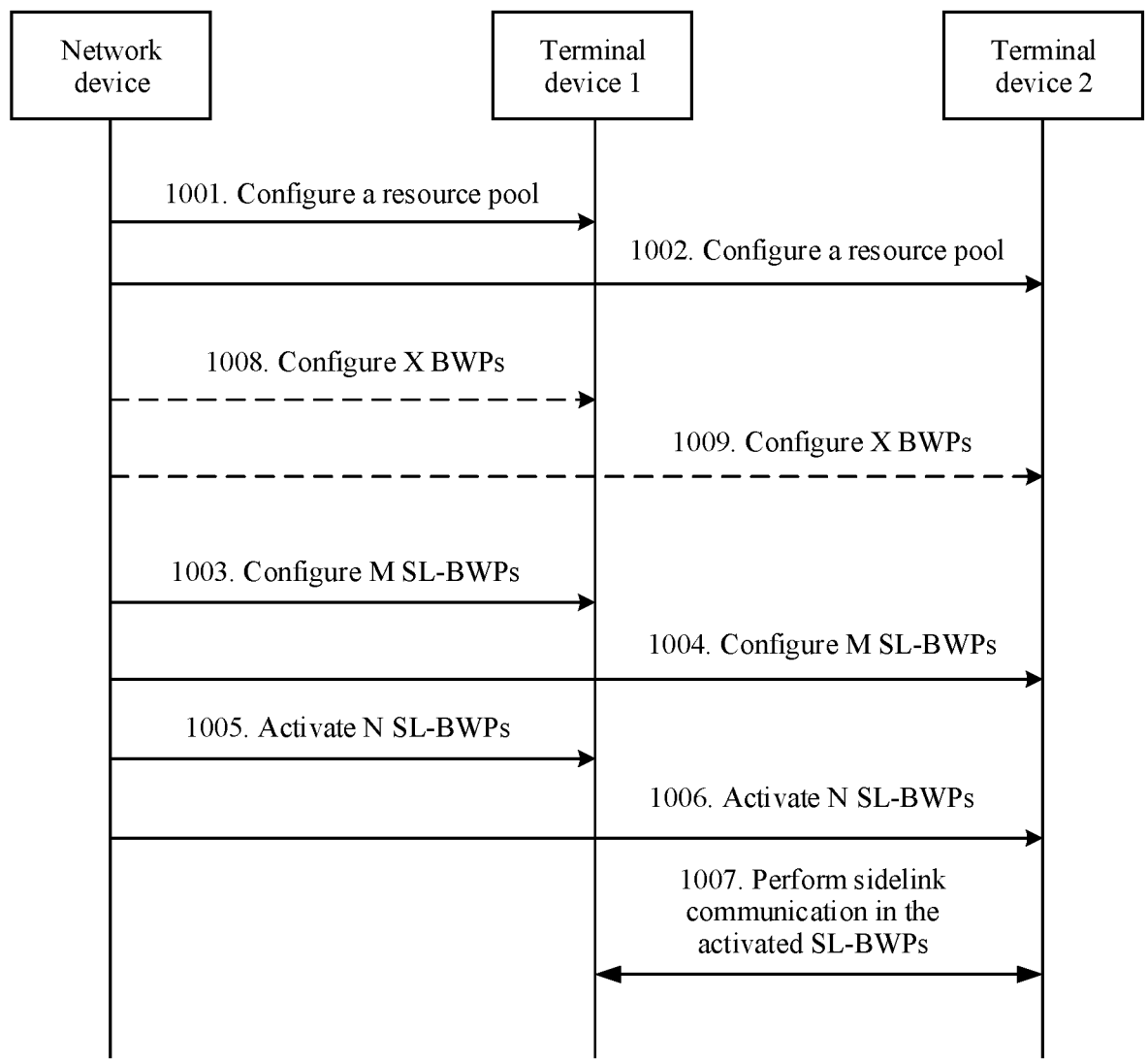
FIG. 6 is a schematic flowchart of a sidelink communication method according to an embodiment of this application.

With reference to FIG. 6, the following uses an example in which the common resource is the common resource pool, to describe in detail a complete process of sidelink communication between the terminal device 1 and the terminal device 2 in the example 1.

A method shown in FIG. 6 includes step 1001 to step 1007. The following describes the steps in detail.

1001. The network device configures a resource pool for the terminal device 1.

1002. The network device configures a resource pool for the terminal device 2.

It should be understood that step 1002 may be performed before step 1001, or may be performed after step 1001, or step 1002 and step 1001 may be simultaneously performed.

In step 1001 and step 1002, the network device may configure resource information for the terminal device 1 and the terminal device 2 by using a system message block (system information block, SIB), cell-specific (cell-specific) RRC signaling, or UE-specific (UE-specific) RRC signaling.

The resource information is equivalent to the foregoing resource configuration information, and a resource can be configured for the terminal device by using the resource information. Specifically, the resource information may be used to configure a resource pool for the terminal device. In this case, the resource information may also be referred to as resource pool information (or resource pool configuration information).

The resource information indicates N resource pools, and the N resource pools include at least M common resource pools (Common Resource Pool) and N-M dedicated resource pools (Dedicated Resource Pool), where N≥1, and 1≤M≤N.

Figure 7:
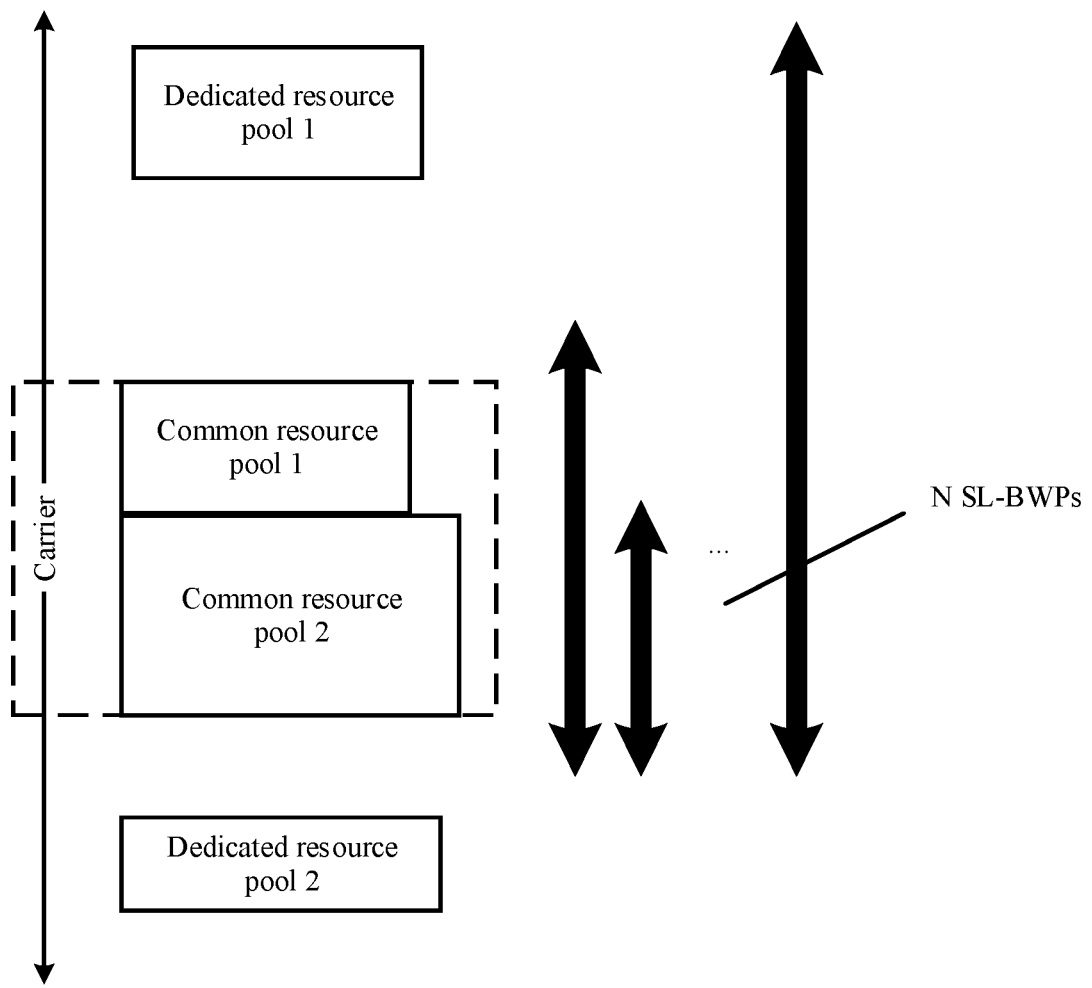
FIG. 7 is a schematic diagram of a configured common resource pool and a configured dedicated resource pool.

As shown in FIG. 7, the network device configures two common resource pools for the terminal device 1 and the terminal device 2. The two common resource pools are a common resource pool 1 (CommonResourcePool #1) and a common resource pool 2 (CommonResourcePool #2).

In addition to the common resource pools, the network device further configures two dedicated resource pools for the terminal device 1 and the terminal device 2. The two dedicated resource pools are a dedicated resource pool 1 (DedicatedResourcePool #1) and a dedicated resource pool 2 (DedicatedResourcePool #2).

The common resource pool is common to all terminal users, and all the terminal users can perform sidelink communication by using the common resource pool, including sending and receiving SL data. Some terminal users can perform sidelink communication by using the dedicated resource pool, which depends on a configuration of the network device and capabilities and requirements of the terminal users.

1003. The network device configures M SL-BWPs for the terminal device 1.

1004. The network device configures M SL-BWPs for the terminal device 2.

In step 1003 and step 1004, the network device may configure the SL-BWPs for the terminal devices through RRC signaling.

1005. The network device activates N SL-BWPs for the terminal device 1.

1006. The network device activates N SL-BWPs for the terminal device 2.

In step 1005 and step 1006, the network device may activate the N SL-BWPs by sending activation signaling to the terminal device 1 and the terminal device 2.

For the terminal device 1, the activated N SL-BWPs include the common resource pool 1 and the common resource pool 2, that is, include all common resource pools. For the terminal device 2, the activated N SL-BWPs also include the common resource pool 1 and the common resource pool 2.

Using the terminal device 1 as an example, that the N SL-BWPs include all common resource pools means that at least one of the N SL-BWPs includes all the common resource pools. For example, as shown in FIG. 7, in the N SL-BWPs, both the first SL-BWP and an $N^{th}$ SL-BWP include the common resource pool 1 and the common resource pool 2.

It should be understood that the terminal device 1 and the terminal device 2 may include different quantities of activated SL-BWPs, and sidelink communication can be performed between the terminal device 1 and the terminal device 2 provided that at least one SL-BWP in the activated SL-BWPs includes all the common resource pools.

1007. The terminal device 1 performs sidelink communication with the terminal device 2 by using the resource pools in the activated N SL-BWPs.

It should be understood that the method shown in FIG. 6 may further include the following steps.

1008. The network device configures X BWPs for the terminal device 1.

1009. The network device configures X BWPs for the terminal device 2.

In step 1008 and step 1009, the terminal device may specifically configure the BWPs for the terminal device 1 and the terminal device 2 through RRC signaling.

For a same terminal device, at least one BWP may be activated at a same moment for communication transmission. A BWP configured in bandwidth used for downlink communication is a DL-BWP, and a BWP configured in bandwidth used for uplink communication is a UL-BWP.

It should be understood that, actions of configuring the BWPs in step 1008 and step 1009 and actions of configuring the SL-BWPs in step 1003 and step 1004 may be performed simultaneously, or may be performed in a sequence (where the BWPs are configured before the SL-BWPs, or the SL-BWPs are configured before the BWPs).

It should be understood that in the example 1, the terminal device 1 or the terminal device 2 may simultaneously perform sidelink communication and uplink communication (communication through a Uu air interface), where the sidelink communication and the uplink communication may occur on a shared carrier (shared carrier), that is, the SL-BWP and the UL-BWP are located on a same carrier. As shown in FIG. 3, the SL-BWP may be inside the UL-BWP and a resource of the UL-BWP is reused in the SL-BWP. In addition, as shown in FIG. 4, sidelink communication and uplink communication occur on a shared carrier (shared carrier), but the SL-BWP and the UL-BWP do not overlap, that is, different resources are used on an SL and a UL.

In some embodiments, sidelink communication and uplink communication alternatively occur on independent carriers (shared carrier), and the SL-BWP and the UL-BWP do not overlap. That is, different resources are used on an SL and a UL.

In the foregoing process, the SL-BWPs are all configured by the network device. When the network device does not perform control, the SL-BWPs may be configured by the terminal device.

Figure 8:
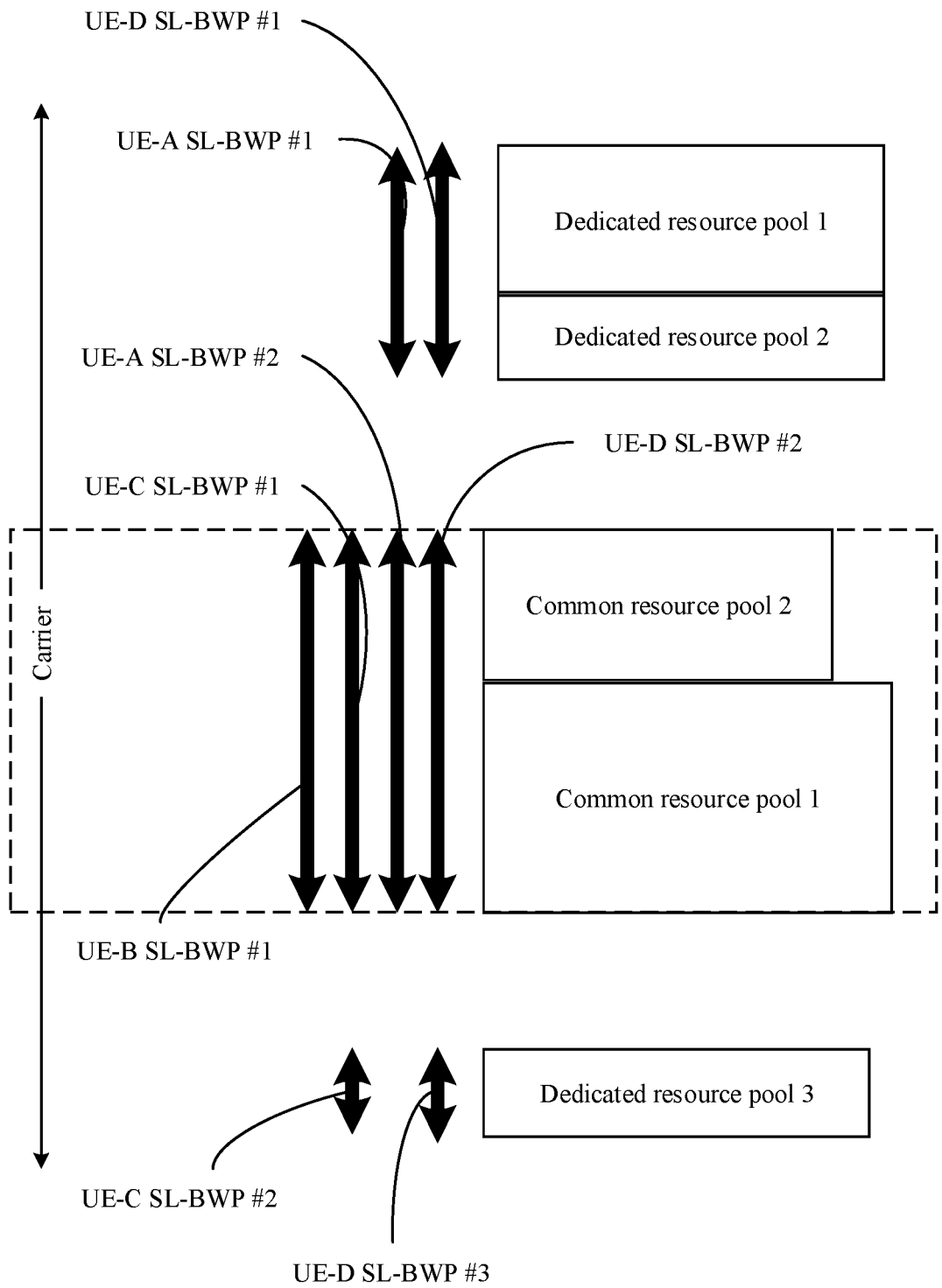
FIG. 8 is a schematic diagram of a correspondence between each SL-BWP and a common resource pool and a correspondence between each SL-BWP and a dedicated resource pool.

In the example 1, the terminal device may not only perform sidelink communication with another terminal device on a time-frequency resource in a common resource pool, but also perform sidelink communication with another terminal device on a time-frequency resource in a dedicated resource pool. Different from the common resource pool, the dedicated resource pool is usually a resource configured by the network device based on a capability or a requirement of the terminal device or selected by a user based on a pre-configured resource or by performing sensing (sensing), and is configured for SL-BWPs of some terminal devices. With reference to FIG. 8, the following describes in detail a process of performing sidelink communication on resources in a common resource pool and a dedicated resource pool.

As shown in FIG. 8, the network device configures two common resource pools and three dedicated resource pools, which are a common resource pool 1 (CommonResourcePool #1), a common resource pool 2 (CommonResourcePool #2), a dedicated resource pool 1 (DedicatedResourcePool #1), a dedicated resource pool 2 (DedicatedResourcePool #2), and a dedicated resource pool 3 (DedicatedResourcePool #3). Assuming that a cell has four terminals, and the four terminals are UE-A, UE-B, UE-C, and UE-D, the network device configures SL-BWPs for the four UEs through RRC signaling, and the SL-BWPs of the UEs are:

UE-A: UE-A SL-BWP #1 and UE-A SL-BWP #2;
UE-B: UE-B SL-BWP #1;
UE-C: UE-C SL-BWP #1 and UE-C SL-BWP #2; and
UE-D: UE-D SL-BWP #1, UE-D SL-BWP #2, and UE-D SL-BWP #3.

Each UE has one SL-BWP that covers the common resource pool 1 and the common resource pool 2.

Further, the dedicated resource pool 1 and the dedicated resource pool 2 are covered by the UE-A SL-BWP #1 and the UE-D SL-BWP #1. In addition to performing sidelink communication on time-frequency resources in the common resource pool 1 and in the common resource pool 2, the UE-A and the UE-D may also perform sidelink communication on a time-frequency resource in the dedicated resource pool 1 or the dedicated resource pool 2.

In addition, the dedicated resource pool 3 is covered by the UE-C SL-BWP #2 and the UE-D SL-BWP #3. Therefore, in addition to performing sidelink communication by using the common resource pool 1 and the common resource pool 2, the UE-C and the UE-D may also perform sidelink communication by using the dedicated resource pool 3.

In addition, in the example 1, when the network device configures the resource pools, configuration information may further include at least one of the following information:

(1) Multiplexing format indication information of sidelink control information (sidelink scheduling assignment, SA) and sidelink data A multiplexing format of the sidelink control information and the sidelink data may be represented by using a bit value of one bit in the multiplexing format indication information. For example, when the value of the bit is 1, it indicates that the sidelink control information and the sidelink data are time division multiplexed; when the value of the bit is 0, it indicates that the sidelink control information and the sidelink data are frequency division multiplexed.

(2) Transmission mode in the sidelink communication, where the transmission mode includes unicast transmission, groupcast transmission, and broadcast transmission. In the sidelink communication, the transmission mode may be represented by using a bit value of two bits. For example, 00 indicates unicast, 01 indicates groupcast, and 10 indicates broadcast.

(3) Subcarrier spacing indication information

The subcarrier spacing indication information may include 3-bit information, and indicate at least subcarrier spacings of 15 kHz, 30 kHz, 60 kHz, 120 kHz, and 240 kHz.

(4) Cyclic prefix (cyclic prefix, CP) indication information

The CP indication information may include 1-bit information. When a value of the bit is 1, it indicates a normal cyclic prefix (normal cyclic prefix, NCP); when a value of the bit is 0, it indicates an extended cyclic prefix (extended cyclic prefix, ECP).

Figure 9:
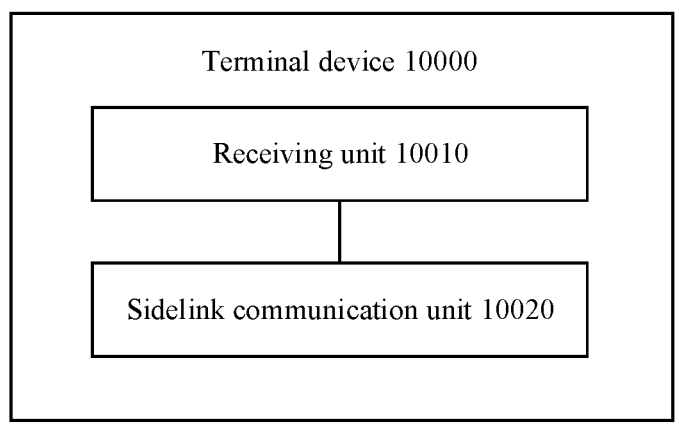
FIG. 9 is a schematic block diagram of a terminal device according to an embodiment of this application.

FIG. 9 is a schematic block diagram of a terminal device according to an embodiment of this application. The terminal device 10000 in FIG. 9 corresponds to the foregoing methods shown in FIG. 2 and FIG. 6. The terminal device 10000 can perform the steps performed by the terminal device in the method shown in FIG. 2. The terminal device 10000 may further perform the steps performed by the terminal device 1 in the method shown in FIG. 6. Limitations and explanations of the steps in the sidelink communication methods in the embodiments of this application in FIG. 2 and FIG. 6 are also applicable to steps performed by the terminal device 10000 shown in FIG. 9. For brevity, repeated descriptions are appropriately omitted in the following description of the terminal device 10000 shown in FIG. 9.

The terminal device 10000 shown in FIG. 9 includes:

a receiving unit 10010, configured to receive resource configuration information sent by a network device, where the resource configuration information is used to configure a common resource for the terminal device, and the common resource is a resource that is configured by the network device for all terminal devices within coverage of the network device and that is to be used by all the terminal devices to perform sidelink communication, where the receiving unit 10010 is further configured to receive sidelink BWP indication information sent by the network device, where the sidelink BWP indication information is used to indicate N sidelink bandwidth parts SL-BWPs, the N SL-BWPs are bandwidth parts BWPs used by the terminal device to perform sidelink communication, and the N SL-BWPs include a frequency domain resource corresponding to the common resource, where N is a positive integer; and a sidelink communication unit 10020, configured to perform sidelink communication with another terminal device in the N SL-BWPs.

In this application, the N SL-BWPs including the frequency domain resource corresponding to the common resource are configured for the terminal device, so that the terminal device can perform sidelink communication with the another terminal device in the N SL-BWPs.

In some embodiments, the common resource is specifically a common resource pool.

In some embodiments, in an embodiment, the receiving unit 10010 is further configured to receive sidelink BWP configuration information sent by the network device, where the sidelink BWP configuration information is used to configure M SL-BWPs for the terminal device, the M SL-BWPs are BWPs available for sidelink communication, and the N SL-BWPs belong to the M SL-BWPs, where M is a positive integer greater than or equal to N.

In some embodiments, in an embodiment, the receiving unit 10010 is further configured to receive uplink BWP indication information sent by the network device, where the uplink BWP indication information is used to indicate Y uplink bandwidth parts UL-BWPs, and Y is a positive integer.

When configuring the SL-BWP, the network device may also configure the UL-BWP for the terminal device, so that the terminal device can perform uplink communication with the network device based on the UL-BWP.

In some embodiments, in an embodiment, the Y UL-BWPs and the N SL-BWPs are located on a same carrier.

The UL-BWP and the SL-BWP are configured on the same carrier, so that utilization efficiency of spectrum resources can be improved.

In some embodiments, in an embodiment, the Y UL-BWPs and the N SL-BWPs include a first frequency domain resource, the first frequency domain resource belongs to the Y UL-BWPs, and the first frequency domain resource belongs to the N SL-BWPs.

When the SL-BWP and the UL-BWP include the same frequency domain resource, some resources of the UL-BWP may be reused in the SL-BWP for sidelink communication, so that utilization efficiency of spectrum resources can be optimized.

In some embodiments, in an embodiment, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In some embodiments, in an embodiment, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

In some embodiments, in an embodiment, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

It should be understood that, in addition to carrying the multiplexing format indication information, the resource configuration information may further carry transmission mode indication and numerology (numerology) indication information, to indicate a transmission mode and a numerology that are used when sidelink communication is performed on the common resource.

In some embodiments, the resource configuration information carries the transmission mode indication information, the transmission mode indication information is used to indicate the transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the resource configuration information carries the numerology indication information, the numerology indication information is used to indicate the numerology used when the terminal device performs sidelink communication on the common resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication.

It should be understood that sidelink communication may be performed between terminal devices on the common resource. In some cases, some terminal devices have a relatively high requirement on service reliability, or have a relatively high requirement on data confidentiality in sidelink communication. In this case, a dedicated resource may be configured for some terminal devices, so that these terminal devices perform sidelink communication on the dedicated resource.

The dedicated resource may be specifically a dedicated resource pool.

Therefore, in addition to configuring the common resource for the terminal device by using the resource configuration information, the network device may further configure a dedicated resource for the terminal device by using the resource configuration information.

In some embodiments, the resource configuration information is further used to configure the dedicated resource for the terminal device, the resource configuration information carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In some embodiments, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

Therefore, the network device can flexibly configure sidelink resources based on different requirements in sidelink communication, so that an effect of sidelink communication can be improved, and system performance can be improved.

In some embodiments, the resource configuration information further carries numerology indication information, the numerology indication information is used to indicate a numerology used when the terminal device performs sidelink communication on the dedicated resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication.

The network device configures the multiplexing format, so that requirements in sidelink communication of different services of the terminal device can be met.

Figure 10:
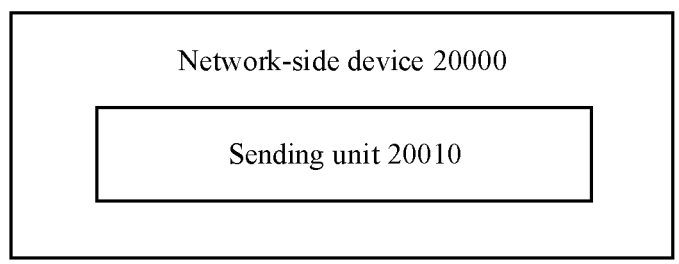
FIG. 10 is a schematic block diagram of a network device according to an embodiment of this application.

FIG. 10 is a schematic block diagram of a network device according to an embodiment of this application. The network device 20000 in FIG. 10 corresponds to the foregoing methods shown in FIG. 2 and FIG. 6. The network device 20000 can perform the steps performed by the network device in the methods shown in FIG. 2 and FIG. 6.

It should be understood that, limitations and explanations of the steps in the sidelink communication methods in the embodiments of this application in FIG. 2 and FIG. 6 are also applicable to steps performed by the network device 20000 shown in FIG. 9. For brevity, repeated descriptions are appropriately omitted in the following description of the network device 20000 shown in FIG. 10.

The network device 20000 shown in FIG. 10 includes:

a sending unit 20010, configured to send resource configuration information to a terminal device, where the resource configuration information is used to configure a common resource for the terminal device, and the common resource is a resource that is configured by the network device for all terminal devices within coverage of the network device and that is to be used by all the terminal devices to perform sidelink communication, where the sending unit 20010 is further configured to send sidelink BWP indication information to the terminal device, where the sidelink BWP indication information is used to indicate N sidelink bandwidth parts SL-BWPs, the N SL-BWPs include a frequency domain resource corresponding to the common resource, and the N SL-BWPs are used by the terminal device to perform sidelink communication with another terminal device, where N is a positive integer.

In this application, the network device configures the N SL-BWPs including the frequency domain resource corresponding to the common resource for the terminal device, so that the terminal device can perform sidelink communication with the another terminal device in the N SL-BWPs.

In some embodiments, in an embodiment, the sending unit 20010 is further configured to send sidelink BWP configuration information to the terminal device, where the sidelink BWP configuration information is used to configure M SL-BWPs for the terminal device, the M SL-BWPs are BWPs available for sidelink communication, and the N SL-BWPs belong to the M SL-BWPs, where M is a positive integer greater than or equal to N.

In some embodiments, in an embodiment, the sending unit 20010 is further configured to send uplink BWP indication information to the terminal device, where the uplink BWP indication information is used to indicate Y uplink bandwidth parts UL-BWPs, and Y is a positive integer.

When configuring the SL-BWP, the network device may also configure the UL-BWP for the terminal device, so that the terminal device can perform uplink communication with the network device based on the UL-BWP.

In some embodiments, in an embodiment, the Y UL-BWPs and the N SL-BWPs are located on a same carrier.

The UL-BWP and the SL-BWP are configured on the same carrier, so that utilization efficiency of spectrum resources can be improved.

In some embodiments, in an embodiment, the Y UL-BWPs and the N SL-BWPs include a first frequency domain resource, the first frequency domain resource belongs to the Y UL-BWPs, and the first frequency domain resource belongs to the N SL-BWPs.

When the SL-BWP and the UL-BWP include the same frequency domain resource, some resources of the UL-BWP may be reused in the SL-BWP for sidelink communication, so that utilization efficiency of spectrum resources can be optimized.

In some embodiments, in an embodiment, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In some embodiments, in an embodiment, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

In some embodiments, in an embodiment, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

It should be understood that, in addition to carrying the multiplexing format indication information, the resource configuration information may further carry transmission mode indication information and numerology (numerology) indication information, to indicate a transmission mode and a numerology that are used when sidelink communication is performed on the common resource.

In some embodiments, the resource configuration information carries the transmission mode indication information, the transmission mode indication information is used to indicate the transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the resource configuration information carries the numerology indication information, the numerology indication information is used to indicate the numerology used when the terminal device performs sidelink communication on the common resource, and the numerology includes a subcarrier spacing (SCS) and a cyclic prefix (CP).

The network device may flexibly configure numerologies based on different requirements in sidelink communication, to further flexibly configure sidelink resources, thereby improving an effect of sidelink communication.

It should be understood that sidelink communication may be performed between terminal devices on the common resource. In some cases, some terminal devices have a relatively high requirement on service reliability, or have a relatively high requirement on data confidentiality in sidelink communication. In this case, a dedicated resource may be configured for some terminal devices, so that these terminal devices perform sidelink communication on the dedicated resource.

Therefore, in addition to configuring the common resource for the terminal device by using the resource configuration information, the network device may further configure a dedicated resource for the terminal device by using the resource configuration information.

In some embodiments, the resource configuration information is further used to configure the dedicated resource for the terminal device, the resource configuration information carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In some embodiments, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

Therefore, the network device can flexibly configure sidelink resources based on different requirements in sidelink communication, so that an effect of sidelink communication can be improved, and system performance can be improved.

In some embodiments, the resource configuration information further carries numerology indication information, the numerology indication information is used to indicate a numerology used when the terminal device performs sidelink communication on the dedicated resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication.

The dedicated resource may be specifically a dedicated resource pool.

It should be understood that the terminal device 10000 and the network device 20000 may be configured to jointly perform the sidelink communication methods shown in FIG. 2 and FIG. 6: The network device 20000 configures a resource for the terminal device 10000 by using resource configuration information, so that N SL-BWPs configured for the terminal device 10000 include a frequency domain resource corresponding to a common resource, and further the terminal device 10000 can perform sidelink communication with another terminal device in the N SL-BWPs.

In addition, when the terminal device includes a memory, a transceiver, and a processor, the receiving unit 10010 in the terminal device 10000 is equivalent to the transceiver, and the sidelink communication unit 10020 is equivalent to the transceiver and the processor.

When the network device includes a memory, a transceiver, and a processor, the sending unit 20010 in the network device 20000 is equivalent to the transceiver.

The foregoing describes in detail the sidelink communication method, the terminal device, and the network device in the embodiments of this application with reference to FIG. 2 to FIG. 10. In the methods shown in FIG. 2 to FIG. 10, a dedicated SL-BWP is set for the terminal device for sidelink communication. Actually, an existing UL-BWP may alternatively be reused for sidelink communication. With reference to FIG. 11 to FIG. 14, the following describes in detail another sidelink communication method according to the embodiments of this application.

Figure 11:
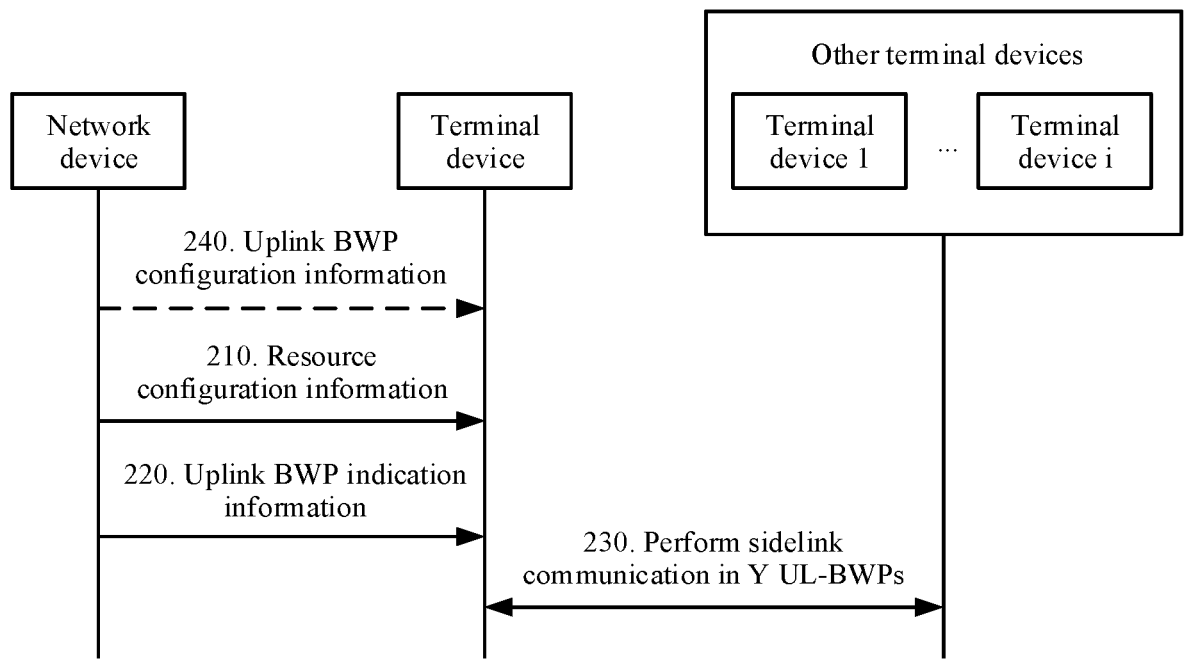
FIG. 11 is a schematic flowchart of a sidelink communication method according to an embodiment of this application.

FIG. 11 is a schematic flowchart of a sidelink communication method according to an embodiment of this application. The method shown in FIG. 11 may be performed by a terminal device. The method shown in FIG. 11 includes step 210 to step 230. The following describes step 210 to step 230 in detail.

210. A network device sends resource configuration information to the terminal device, and the terminal device receives the resource configuration information, where the resource configuration information is used to configure a common resource for the terminal device, and the common resource is a resource that is configured by the network device for all terminal devices within coverage of the network device and that is to be used by all the terminal devices to perform sidelink communication.

The common resource is the resource that is configured by the network device for all the terminal devices within the coverage of the network device and that is to be used by all the terminal devices to perform sidelink communication.

In some embodiments, the common resource is specifically a common resource pool.

220. The network device sends uplink BWP indication information to the terminal device, and the terminal device receives the uplink BWP indication information, where the uplink BWP indication information is used to indicate Y UL-BWPs, and the Y UL-BWPs include a frequency domain resource corresponding to the common resource, where Y is a positive integer.

230. The terminal device performs sidelink communication with another terminal device in the Y UL-BWPs.

As shown in FIG. 11, the another terminal device may include at least one terminal device such as a terminal device 1 to a terminal device i (where i is a positive integer). In other words, in the method shown in FIG. 11, the terminal device may communicate with one or more other terminal devices in the N SL-BWPs.

In this application, the Y SL-BWPs including the frequency domain resource corresponding to the common resource are configured for the terminal device, so that the terminal device can perform sidelink communication with the another terminal device by reusing the Y UL-BWPs.

It should be understood that, that the Y UL-BWPs include the frequency domain resource corresponding to the common resource may mean that at least one UL-BWP in the Y UL-BWPs includes the frequency domain resource corresponding to the common resource.

In some embodiments, the common resource includes K common sub-resources, and K is a positive integer greater than 1.

For example, the common resource is configured by using the resource configuration information, and the common resource includes three common sub-resources. Assuming that the uplink BWP indication information indicates three UL-BWPs, only one UL-BWP in the three UL-BWPs may include frequency domain resources corresponding to all of the three common sub-resources, or two UL-BEPs in the three UL-BWPs may include frequency domain resources corresponding to all of the three common sub-resources, or each of the three UL-BWPs may include a frequency domain resource corresponding to one common sub-resource.

In some embodiments, the method shown in FIG. 11 further includes step 240. Step 240 includes: The network device sends uplink BWP configuration information to the terminal device, and the terminal device receives the uplink BWP configuration information, where the uplink BWP configuration information is used to configure X UL-BWPs for the terminal device.

The Y UL-BWPs belong to the X UL-BWPs, and X is a positive integer greater than or equal to Y. The Y UL-BWPs may be BWPs activated by the network device in the X UL-BWPs.

In some embodiments, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

It should be understood that, in addition to carrying the multiplexing format indication information, the resource configuration information may further carry transmission mode indication information and numerology (numerology) indication information, to indicate a transmission mode and a numerology that are used when sidelink communication is performed on the common resource.

In some embodiments, the resource configuration information carries the transmission mode indication information, the transmission mode indication information is used to indicate the transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the resource configuration information carries the numerology indication information, the numerology indication information is used to indicate the numerology used when the terminal device performs sidelink communication on the common resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication.

It should be understood that sidelink communication may be performed between terminal devices on the common resource. In some cases, some terminal devices have a relatively high requirement on service reliability, or have a relatively high requirement on data confidentiality in sidelink communication. In this case, a dedicated resource may be configured for some terminal devices, so that these terminal devices perform sidelink communication on the dedicated resource.

Therefore, in addition to configuring the common resource for the terminal device by using the resource configuration information, the network device may further configure a dedicated resource for the terminal device by using the resource configuration information.

In some embodiments, the resource configuration information is further used to configure the dedicated resource for the terminal device, the resource configuration information carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In some embodiments, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

Therefore, the network device can flexibly configure sidelink resources based on different requirements in sidelink communication, so that an effect of sidelink communication can be improved, and system performance can be improved.

In some embodiments, the resource configuration information further carries numerology indication information, the numerology indication information is used to indicate a numerology used when the terminal device performs sidelink communication on the dedicated resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication. The dedicated resource may be specifically a dedicated resource pool.

The network device may configure dedicated resources for some terminal devices based on characteristics of sidelink communication and requirements in sidelink communication, so that the some terminal devices perform sidelink communication by using the configured dedicated resources, thereby improving system performance.

The foregoing describes the sidelink communication method in the embodiments of this application in detail with reference to FIG. 11. To better understand the sidelink communication method in the embodiments of this application, the following describes in detail a process of performing sidelink communication between a terminal device 1 and a terminal device 2 with reference to an example 2 (corresponding to FIG. 12 to FIG. 14).

Figure 12:
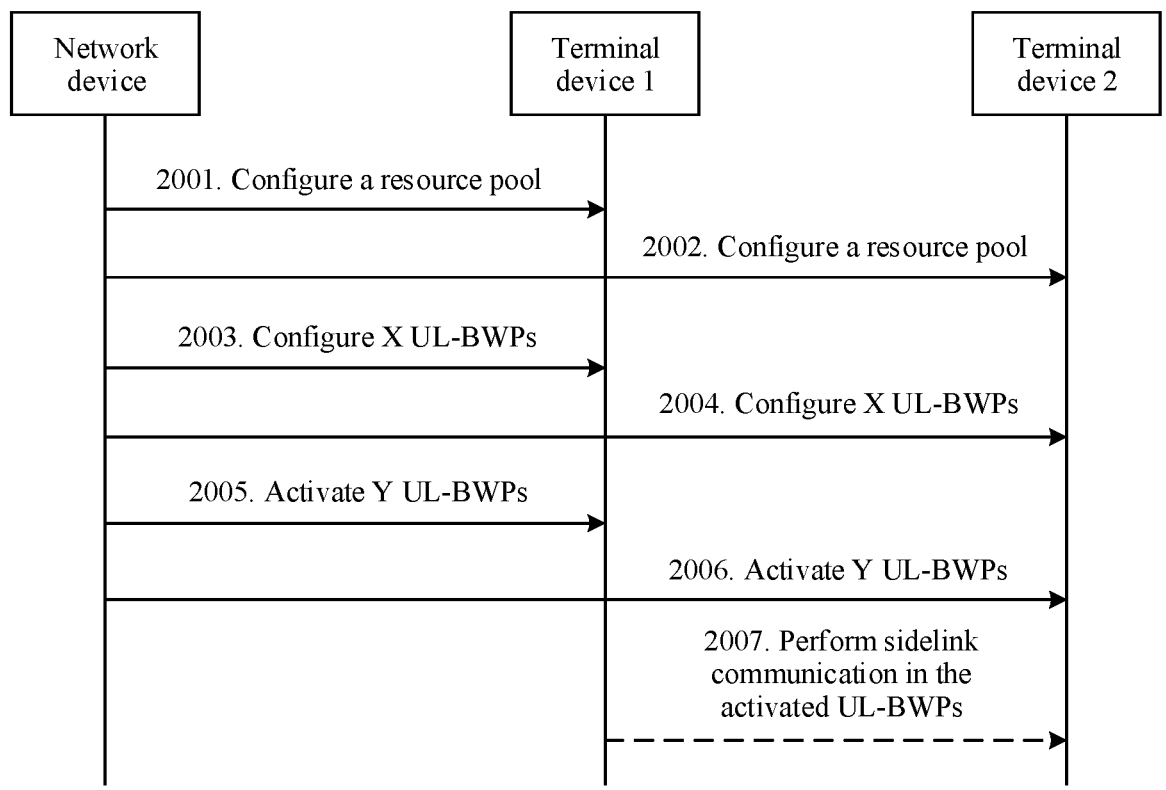
FIG. 12 is a schematic flowchart of a sidelink communication method according to an embodiment of this application.

In the example 2, the network device configures a UL-BWP including a common resource (where the common resource may be a common resource pool) for the terminal device, so that the terminal device can perform sidelink communication by reusing the resource pool of the UL-BWP. With reference to FIG. 12, the following describes in detail a complete process of sidelink communication between the terminal device 1 and the terminal device 2 in the example 2.

With reference to FIG. 12, the following uses an example in which the common resource is the common resource pool, to describe in detail the complete process of sidelink communication between the terminal device 1 and the terminal device 2 in the example 2.

A method shown in FIG. 12 includes step 2001 to step 2006. The following describes the steps in detail.

2001. The network device configures a resource pool for the terminal device 1.

2002. The network device configures a resource pool for the terminal device 2.

It should be understood that step 2002 may be performed before step 2001, or may be performed after step 2001, or step 2002 and step 2001 are simultaneously performed.

In step 2001 and step 2002, the network device may configure resource pool information for the terminal device 1 and the terminal device 2 by using a SIB, cell-specific RRC signaling, or UE-specific RRC signaling.

The resource pool information indicates N resource pools, and the N resource pools include at least M common resource pools and N-M dedicated resource pools, where N≥1, and 1≤M≤N.

Figure 13:
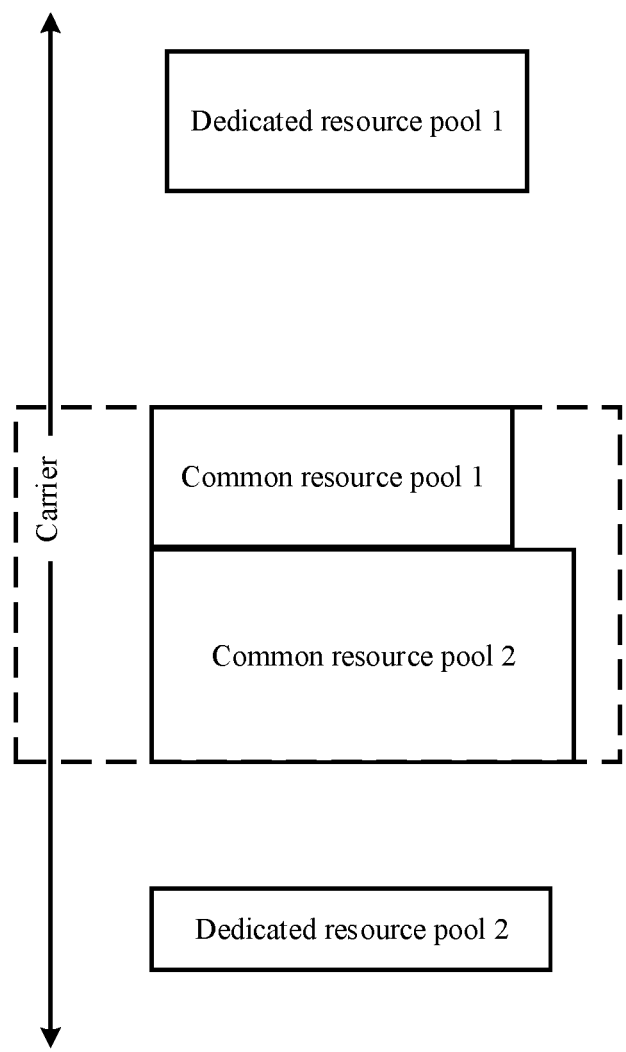
FIG. 13 is a schematic diagram of a configured common resource pool and a configured dedicated resource pool.

For example, as shown in FIG. 13, the network device configures two common resource pools and two dedicated resource pools, which are a common resource pool 1 (CommonResourcePool #1), a common resource pool 2 (CommonResourcePool #2), a dedicated resource pool 1 (DedicatedResourcePool #1), and a dedicated resource pool 2 (DedicatedResourcePool #2).

2003. The network device configures X UL-BWPs for the terminal device 1.

2004. The network device configures X UL-BWPs for the terminal device 2.

In step 2003 and step 2004, the network device may configure the BWPs for the terminal devices through RRC signaling.

2005. The network device activates Y UL-BWPs for the terminal device 1.

2006. The network device activates Y UL-BWPs for the terminal device 2.

In step 2005 and step 2006, the network device may activate the Y BWPs by sending activation signaling to the terminal device 1 and the terminal device 2.

For the terminal device 1, the activated Y UL-BWPs include the common resource pool 1 and the common resource pool 2, that is, include all common resource pools. For the terminal device 2, the activated Y UL-BWPs also include the common resource pool 1 and the common resource pool 2.

Using the terminal device 1 as an example, that the N UL-BWPs include all common resource pools means that at least one of the N UL-BWPs includes all the common resource pools.

It should be understood that the terminal device 1 and the terminal device 2 may include different quantities of activated UL-BWPs, and sidelink communication can be performed between the terminal device 1 and the terminal device 2 provided that at least one UL-BWP in the activated UL-BWPs includes all the common resource pools.

2007. The terminal device 1 performs sidelink communication with the terminal device 2 in the activated UL-BWPs.

Figure 14:
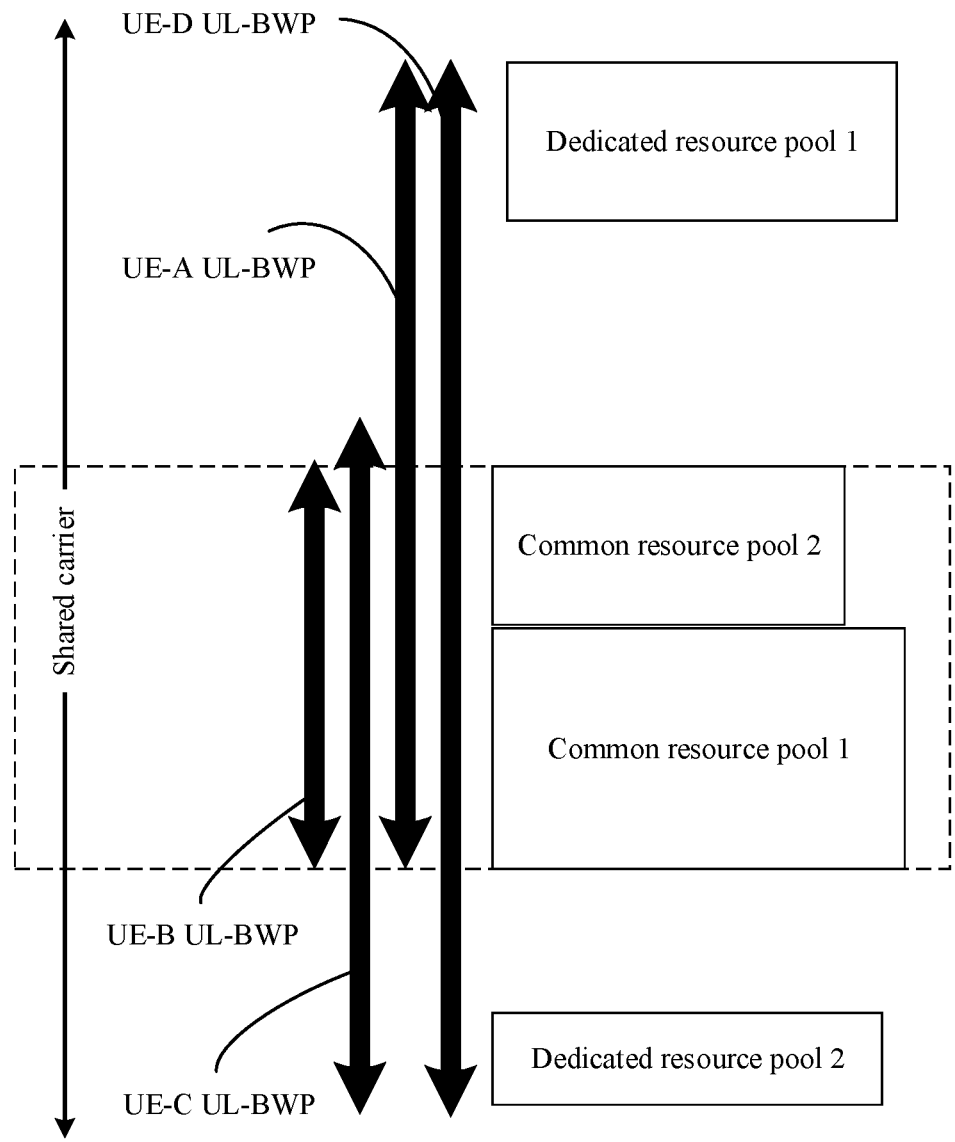
FIG. 14 is a schematic diagram of a correspondence between each UL-BWP and a common resource pool and a correspondence between each UL-BWP and a dedicated resource pool.

In the example 2, the terminal device may not only perform sidelink communication with another terminal device on a time-frequency resource in a common resource pool, but also perform sidelink communication with another terminal device on a time-frequency resource in a dedicated resource pool. Different from the common resource pool, the dedicated resource pool is usually a resource configured by the network device based on a capability or a requirement of the terminal device or selected by a user based on a pre-configured resource or by performing sensing (sensing), and is configured for UL-BWPs of some terminal devices. With reference to FIG. 14, the following describes in detail a process of performing sidelink communication on resources in a common resource pool and a dedicated resource pool.

For example, as shown in FIG. 14, the network device configures two common resource pools and two dedicated resource pools, which are a common resource pool 1 (CommonResourcePool #1), a common resource pool 2 (CommonResourcePool #2), a dedicated resource pool 1 (DedicatedResourcePool #1), and a dedicated resource pool 2 (DedicatedResourcePool #2).

Assuming that a cell has four terminal users, which are UE-A, UE-B, UE-C, and UE-D, the network device configures UL-BWPs for the four UEs through RRC signaling, and the UL-BWPs of the UEs are:

UE-A: UE-A UL-BWP;
UE-B: UE-B UL-BWP;
UE-C: UE-C UL-BWP; and
UE-D: UE-D UL-BWP.

Each UE has one UL-BWP that covers the common resource pool 1 and the common resource pool 2.

Further, the UE-B UL-BWP covers only the common resource pool 1 and the common resource pool 2. Therefore, the UE-B can perform sidelink communication only on a time-frequency resource in the common resource pool 1 and the common resource pool 2. The UE-C UL-BWP not only covers the common resource pool 1 and the common resource pool 2, but also covers the dedicated resource pool 2. The UE-A UL-BWP not only covers the common resource pool 1 and the common resource pool 2, but also covers the dedicated resource pool 1. The UE-D UL-BWP covers all common resource pools and all dedicated resource pools. Therefore, in addition to performing sidelink communication with the other three UEs on time-frequency resources in the dedicated resource pool 1 and the dedicated resource pool 2, the UE-D may further communicate with the UE-A on a resource in the dedicated resource pool 1, and may further communicate with the UE-C on a time-frequency resource in the dedicated resource pool 2.

In addition, in the example 2, when the network device configures the resource pools, configuration information may further include at least one of the following information:

(1) Multiplexing format indication information of sidelink control information (SA) and sidelink data
(2) Transmission mode in sidelink communication
(2) Subcarrier spacing (SCS) indication information
(3) Cyclic prefix (CP) indication information For a specific indication manner of the indication information, refer to related content in the example 1. Details are not described herein again.

Figure 15:
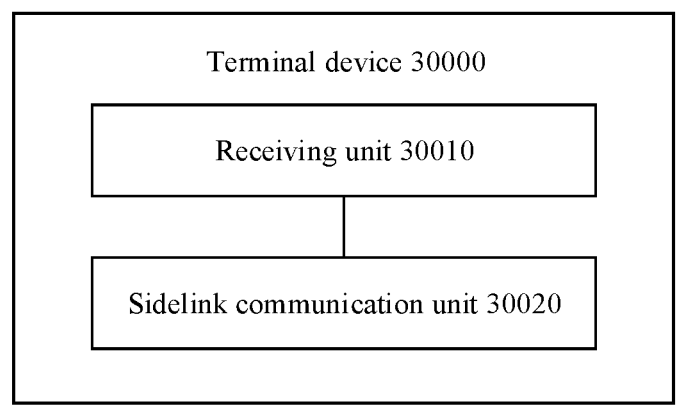
FIG. 15 is a schematic block diagram of a terminal device according to an embodiment of this application.

FIG. 15 is a schematic block diagram of a terminal device according to an embodiment of this application. The terminal device 30000 in FIG. 15 corresponds to the foregoing methods shown in FIG. 11 and FIG. 12. The terminal device 30000 can perform steps performed by the terminal device in the method shown in FIG. 11, and the terminal device 30000 may further perform steps performed by the terminal device 1 in the method shown in FIG. 12. Limitations and explanations of the steps in the sidelink communication methods in the embodiments of this application in FIG. 11 and FIG. 12 are also applicable to steps performed by the terminal device 30000 shown in FIG. 15. For brevity, repeated descriptions are appropriately omitted in the following description of the terminal device 30000 shown in FIG. 15.

The terminal device 30000 shown in FIG. 15 includes:

a receiving unit 30010, configured to receive resource configuration information sent by a network device, where the resource configuration information is used to configure a common resource for the terminal device, and the common resource is a resource that is configured by the network device for all terminal devices within coverage of the network device and that is to be used by all the terminal devices to perform sidelink communication, where the receiving unit 30010 is further configured to receive uplink BWP indication information sent by the network device, where the uplink BWP indication information is used to indicate Y UL-BWPs, and the Y UL-BWPs include a frequency domain resource corresponding to the common resource, where Y is a positive integer; and a sidelink communication unit 30020, configured to perform sidelink communication with another terminal device in the Y UL-BWPs.

When the sidelink communication is that the terminal device sends sidelink control information or sidelink data to the another terminal device, the sidelink communication unit 30020 may be a transceiver unit or a sending unit. When the sidelink communication is that the terminal device receives sidelink acknowledgement information or feedback information from the another terminal device, the sidelink communication unit 30020 may be a transceiver unit or the receiving unit 30010.

In some embodiments, the common resource is specifically a common resource pool.

In this application, the Y SL-BWPs including the frequency domain resource corresponding to the common resource are configured for the terminal device, so that the terminal device can perform sidelink communication with the another terminal device by reusing the Y UL-BWPs.

In some embodiments, the receiving unit 30010 is further configured to receive uplink BWP configuration information sent by the network device, where the uplink BWP configuration information is used to configure X UL-BWPs for the terminal device, and the Y UL-BWPs belong to the X UL-BWPs, where X is a positive integer greater than or equal to Y.

In some embodiments, in an embodiment, the uplink BWP configuration information carries X pieces of multiplexing format indication information, the X pieces of multiplexing format indication information are in a one-to-one correspondence with the X UL-BWPs, any one piece of multiplexing format indication information is used to indicate a multiplexing format of sidelink data and sidelink control information that are sent by the terminal device when the terminal device performs sidelink communication by using a UL-BWP corresponding to the multiplexing format indication information, and the multiplexing format includes frequency division multiplexing and time division multiplexing.

The network device may flexibly configure sidelink resources based on a service type or another requirement, to improve system performance.

Figure 16:
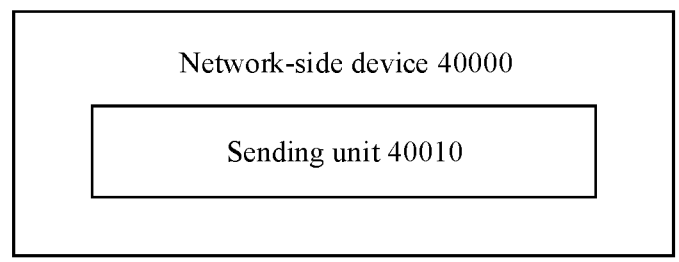
FIG. 16 is a schematic block diagram of a network device according to an embodiment of this application.

FIG. 16 is a schematic block diagram of a network device according to an embodiment of this application. The network device 40000 in FIG. 16 corresponds to the foregoing methods shown in FIG. 11 and FIG. 12. The network device 40000 can perform the steps performed by the network device in the methods shown in FIG. 11 and FIG. 12.

It should be understood that, limitations and explanations of the steps in the sidelink communication methods in the embodiments of this application in FIG. 11 and FIG. 12 are also applicable to steps performed by the network device 40000 shown in FIG. 16. For brevity, repeated descriptions are appropriately omitted in the following description of the network device 40000 shown in FIG. 16.

The network device 40000 shown in FIG. 16 includes:

a sending unit 40010, configured to send resource configuration information to a terminal device, where the resource configuration information is used to configure a common resource for the terminal device, and the common resource is a resource that is configured by the network device for all terminal devices within coverage of the network device and that is to be used by all the terminal devices to perform sidelink communication, where the sending unit 40010 is further configured to send uplink BWP indication information to the terminal device, where the uplink BWP indication information is used to indicate Y UL-BWPs, the Y UL-BWPs include a frequency domain resource corresponding to the common resource, and the Y UL-BWPs are used by the terminal device to perform sidelink communication with another terminal device, where Y is a positive integer.

In some embodiments, the common resource is specifically a common resource pool.

In this application, the network device configures the Y SL-BWPs including the frequency domain resource corresponding to the common resource for the terminal device, so that the terminal device can perform sidelink communication with the another terminal device by reusing the Y SL-BWPs.

In some embodiments, the sending unit 40010 is further configured to send uplink BWP configuration information to the terminal device, where the uplink BWP configuration information is used to configure X UL-BWPs for the terminal device, and the Y UL-BWPs belong to the X UL-BWPs, where X is a positive integer greater than or equal to Y.

In some embodiments, the uplink BWP configuration information carries X pieces of multiplexing format indication information, the X pieces of multiplexing format indication information are in a one-to-one correspondence with the X UL-BWPs, any one piece of multiplexing format indication information is used to indicate a multiplexing format of sidelink data and sidelink control information that are sent by the terminal device when the terminal device performs sidelink communication by using a UL-BWP corresponding to the multiplexing format indication information, and the multiplexing format includes frequency division multiplexing and time division multiplexing.

In some embodiments, the resource configuration information carries multiplexing format indication information, the multiplexing format indication information is used to indicate a multiplexing format of sidelink data and sidelink control information that are sent by the terminal device when the terminal device performs sidelink communication on the common resource, and the multiplexing format includes frequency division multiplexing and time division multiplexing.

The network device configures the multiplexing format, so that requirements in sidelink communication of different services of the terminal device can be met.

It should be understood that, in addition to carrying the multiplexing format indication information, the resource configuration information may further carry transmission mode indication information and numerology (numerology) indication information, to indicate a transmission mode and a numerology that are used when sidelink communication is performed on the common resource.

In some embodiments, the resource configuration information carries the transmission mode indication information, the transmission mode indication information is used to indicate the transmission mode used when the terminal device performs sidelink communication on the common resource, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the resource configuration information carries the numerology indication information, the numerology indication information is used to indicate the numerology (numerology) used when the terminal device performs sidelink communication on the common resource, and the numerology includes a subcarrier spacing (subcarrier spacing, SCS) and a cyclic prefix (cyclic prefix, CP).

The network device may flexibly configure numerologies based on different requirements in sidelink communication, to further flexibly configure sidelink resources, thereby improving an effect of sidelink communication.

It should be understood that sidelink communication may be performed between terminal devices on the common resource. In some cases, some terminal devices have a relatively high requirement on service reliability, or have a relatively high requirement on data confidentiality in sidelink communication. In this case, a dedicated resource may be configured for some terminal devices, so that these terminal devices perform sidelink communication on the dedicated resource.

Therefore, in addition to configuring the common resource for the terminal device by using the resource configuration information, the network device may further configure a dedicated resource for the terminal device by using the resource configuration information.

In some embodiments, the resource configuration information is further used to configure the dedicated resource for the terminal device, the resource configuration information carries multiplexing format indication information, the multiplexing format indication information is used to indicate a multiplexing format of sidelink data and sidelink control information that are sent by the terminal device when the terminal device performs sidelink communication on the dedicated resource, and the multiplexing format includes frequency division multiplexing and time division multiplexing.

In some embodiments, the resource configuration information further carries transmission mode indication information, the transmission mode indication information is used to indicate a transmission mode used when the terminal device performs sidelink communication on the dedicated resource, and the transmission mode includes unicast transmission (unicast), groupcast transmission (groupcast), and broadcast transmission (broadcast).

Therefore, the network device can flexibly configure sidelink resources based on different requirements in sidelink communication, so that an effect of sidelink communication can be improved, and system performance can be improved.

In some embodiments, the resource configuration information further carries numerology indication information, the numerology indication information is used to indicate a numerology used when the terminal device performs sidelink communication on the dedicated resource, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication. The dedicated resource may be specifically a dedicated resource pool.

The network device may flexibly configure sidelink resources based on a service type or another requirement, to improve system performance.

It should be understood that the terminal device 30000 and the network device 40000 may be configured to jointly perform the sidelink communication methods shown in FIG. 11 and FIG. 12: The network device 40000 configures a resource for the terminal device 30000 by using resource configuration information, so that Y UL-BWPs configured for the terminal device 30000 include a frequency domain resource corresponding to a common resource, and further the terminal device 30000 can perform sidelink communication with another terminal device in the Y UL-BWPs.

In addition, when the terminal device includes a memory, a transceiver, and a processor, the receiving unit 30010 in the terminal device 30000 is equivalent to the transceiver, and the sidelink communication unit 30020 is equivalent to the transceiver and the processor.

When the network device includes a memory, a transceiver, and a processor, the sending unit 40010 in the network device 40000 is equivalent to the transceiver.

Figure 17:
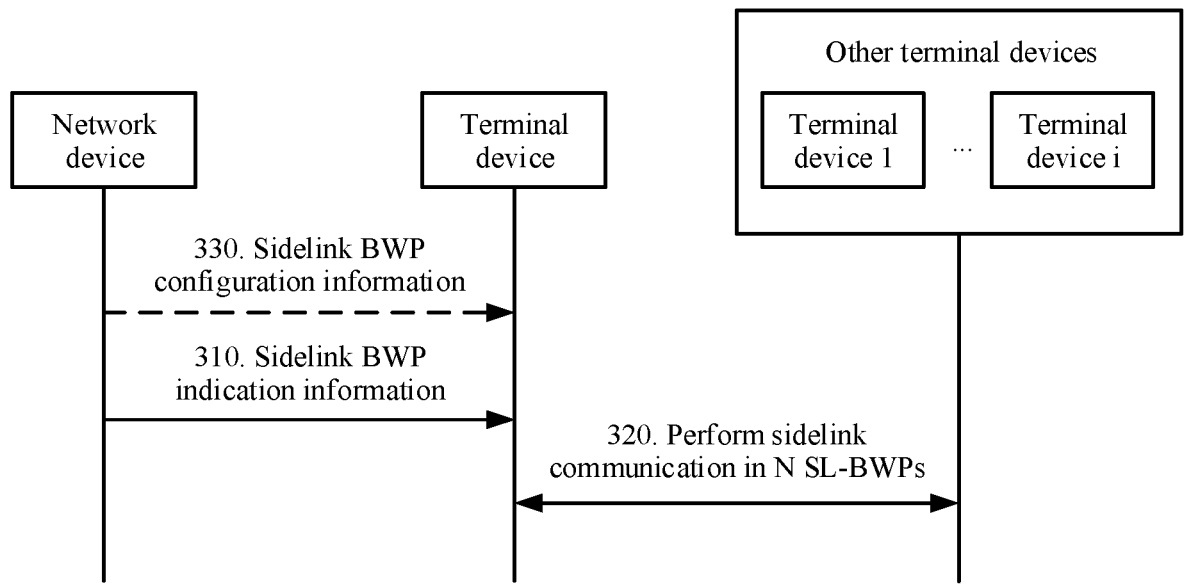
FIG. 17 is a schematic flowchart of a sidelink communication method according to an embodiment of this application.
Figure 18:
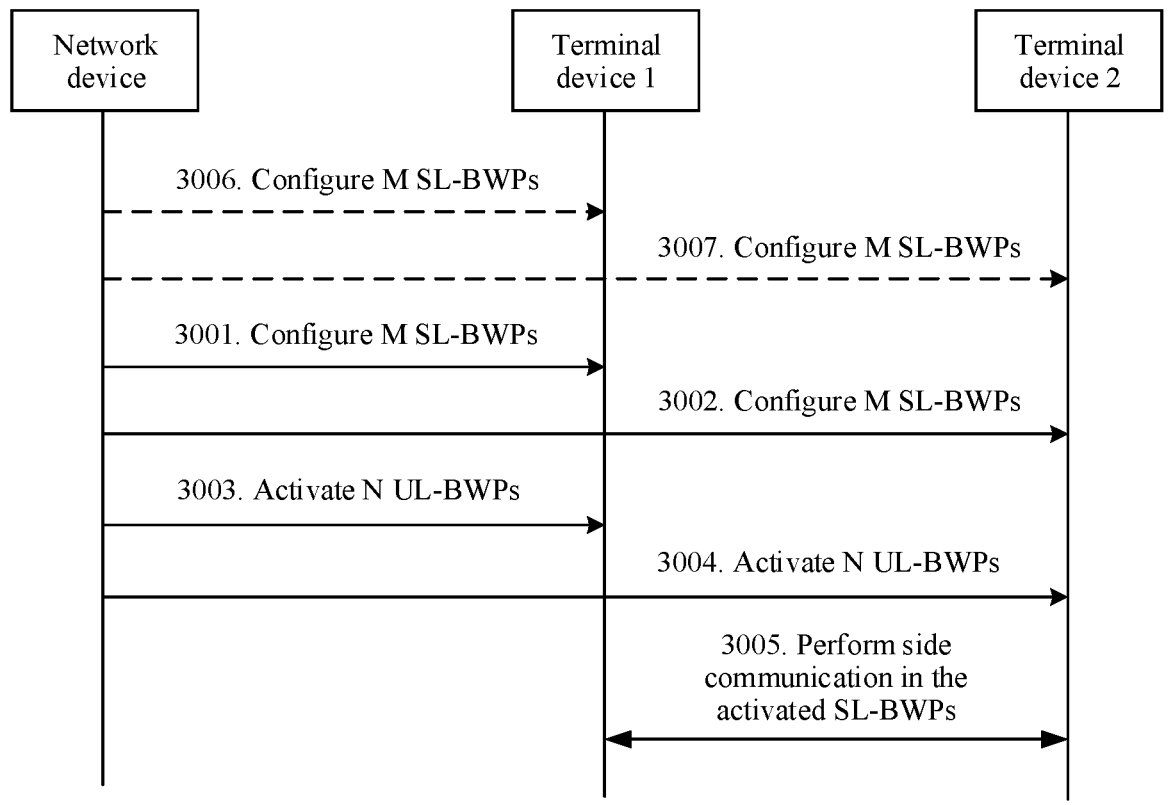
FIG. 18 is a schematic flowchart of a sidelink communication method according to an embodiment of this application.

The foregoing describes in detail the sidelink communication method, the terminal device, and the network device in the embodiments of this application with reference to FIG. 11 to FIG. 16. In the methods shown in FIG. 11 to FIG. 16, the UL-BWPs including the common resource are set for the terminal device, and sidelink communication is performed by reusing the UL-BWPs. Actually, N SL-BWPs including a common SL-BWP may alternatively be configured for the terminal device, so that the terminal device can perform sidelink communication with another terminal device in the N SL-BWPs. With reference to FIG. 17 and FIG. 18, the following describes in detail another sidelink communication method according to the embodiments of this application.

FIG. 17 is a schematic flowchart of a sidelink communication method according to an embodiment of this application. The method shown in FIG. 17 may be performed by a terminal device. The method shown in FIG. 17 includes step 310 and step 320. The following describes step 310 and step 320 in detail.

310. A network device sends sidelink BWP indication information, and the terminal device receives the sidelink BWP indication information.

The sidelink BWP indication information is used to indicate N sidelink bandwidth parts SL-BWPs, the N SL-BWPs are bandwidth parts BWPs used by the terminal device to perform sidelink communication, the N SL-BWPs include a common SL-BWP, and the common SL-BWP is a frequency domain resource that is configured by the network device for all terminal devices within coverage of the network device and that is to be used by all the terminal devices to perform sidelink communication.

320. The terminal device performs sidelink communication with another terminal device in the N SL-BWPs.

As shown in FIG. 17, the another terminal device may include at least one terminal device such as a terminal device 1 to a terminal device i (where i is a positive integer). In other words, in the method shown in FIG. 17, the terminal device may communicate with one or more other terminal devices in the N SL-BWPs.

In this application, the N SL-BWPs including the common SL-BWP are configured for the terminal device, so that the terminal device can perform sidelink communication with the another terminal device in the N SL-BWPs.

In some embodiments, the method shown in FIG. 17 further includes step 330, and step 330 includes: The terminal device receives sidelink BWP configuration information sent by the network device, where the sidelink BWP configuration information is used to configure M SL-BWPs for the terminal device, the M SL-BWPs are BWPs available for sidelink communication, and the N SL-BWPs belong to the M SL-BWPs, where M is a positive integer greater than or equal to N.

The N SL-BWPs may be SL-BWPs activated by the network device in the M SL-BWPs.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

Therefore, the network device may flexibly configure sidelink resources based on a service type or another requirement, to improve system performance.

In some embodiments, Y UL-BWPs and the N SL-BWPs are located on a same carrier.

The UL-BWP and the SL-BWP are configured on the same carrier, so that utilization efficiency of spectrum resources can be improved.

In some embodiments, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In some embodiments, the Y UL-BWPs and N SL-BWPs do not include a same frequency domain resource.

Different frequency domain resources are configured for the UL-BWP and the SL-BWP, so that sidelink communication and uplink communication are independent of each other and do not interfere with each other.

In some embodiments, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

Therefore, the network device may flexibly configure sidelink resources based on a service type or another requirement, to improve system performance.

In some embodiments, the sidelink BWP configuration information carries M pieces of multiplexing format indication information, the M pieces of multiplexing format indication information are in a one-to-one correspondence with the M SL-BWPs, any one piece of multiplexing format indication information is used to indicate a multiplexing format of sidelink data and sidelink control information that are sent when sidelink communication is performed by using an SL-BWP corresponding to the multiplexing format indication information, and the multiplexing format available for the sidelink data and the sidelink control information includes frequency division multiplexing and time division multiplexing.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In some embodiments, the sidelink BWP configuration information carries M pieces of transmission mode information, the M pieces of transmission mode information are in a one-to-one correspondence with the M SL-BWPs, any one piece of transmission mode information is used to indicate a transmission mode of sidelink data and sidelink control information that are sent when sidelink communication is performed by using an SL-BWP corresponding to the transmission mode information, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the sidelink BWP configuration information carries M pieces of numerology (numerology) information, the M pieces of numerology information are in a one-to-one correspondence with the M SL-BWPs, any one piece of numerology information is used to indicate a numerology of sidelink data and sidelink control information that are sent when sidelink communication is performed by using an SL-BWP corresponding to the numerology information, and the numerology includes a subcarrier spacing (SCS) and a cyclic prefix (CP).

The network device may flexibly configure numerologies based on different requirements in sidelink communication, to further flexibly configure sidelink resources, thereby improving an effect of sidelink communication.

The foregoing describes the sidelink communication method in the embodiments of this application in detail with reference to FIG. 17. To better understand the sidelink communication method in the embodiments of this application, the following describes in detail a process of performing sidelink communication between a terminal device 1 and a terminal device 2 with reference to an example 3 (corresponding to FIG. 18).

In the example 3, the network device does not configure a resource pool, but directly configures SL-BWPs for a plurality of terminal devices. The configured SL-BWPs include a common BWP. The common SL-BWP is a frequency domain resource that is configured by the network device for all terminal devices within coverage of the network device and that is to be used by all the terminal devices to perform sidelink communication.

The following uses the terminal device 1 and the terminal device 2 as an example to describe in detail a complete process of sidelink communication between the terminal device 1 and the terminal device 2 in the example 3 with reference to FIG. 18.

The method shown in FIG. 18 includes step 3001 to step 3007, and the following describes these steps in detail.

3001. The network device configures M SL-BWPs for the terminal device 1.

3002. The network device configures M SL-BWPs for the terminal device 2.

In step 3001 and step 3002, the network device may configure the SL-BWPs for the terminal devices through RRC signaling.

3003. The network device activates N SL-BWPs for the terminal device 1.

3004. The network device activates N SL-BWPs for the terminal device 2.

In step 3003 and step 3004, the network device may activate the N SL-BWPs by sending activation signaling to the terminal device 1 and the terminal device 2.

For the terminal device 1, the activated N SL-BWPs include a common BWP, and the common SL-BWP is a frequency domain resource that is configured by the network device for all terminal devices within coverage of the network device and that is to be used by all the terminal devices to perform sidelink communication.

It should be understood that there may be one or more common SL-BWPs.

Similarly, for the terminal device 2, the activated N SL-BWPs also include the common BWP.

3005. The terminal device 1 performs sidelink communication with the terminal device 2 by using resource pools in the activated N SL-BWPs.

It should be understood that the method shown in FIG. 18 may further include the following steps.

3006. The network device configures X BWPs for the terminal device 1.

3007. The network device configures X BWPs for the terminal device 2.

In step 3006 and step 3007, the terminal device may specifically configure the BWPs for the terminal device 1 and the terminal device 2 through RRC signaling. For a same terminal device, at least one BWP may be activated at a same moment for communication transmission. A BWP configured in bandwidth used for downlink communication is a DL-BWP, and a BWP configured in bandwidth used for uplink communication is a UL-BWP.

It should be understood that, actions of configuring the BWPs in step 3006 and step 3007 and actions of configuring the SL-BWPs in step 3001 and step 3002 may be performed simultaneously, or may be performed in a sequence (where the BWPs are configured before the SL-BWPs, or the SL-BWPs are configured before the BWPs).

It should be understood that in the example 3, the terminal device 1 or the terminal device 2 may simultaneously perform sidelink communication and uplink communication, where the sidelink communication and the uplink communication may occur on a shared carrier (shared carrier), that is, the SL-BWP and the UL-BWP are located on a same carrier. When the SL-BWP and the UL-BWP are located on a same carrier, the SL-BWP and the L-BWP may include a same frequency domain resource. Further, the SL-BWP may be all located in the UL-BWP, that is, all frequency domain resources of the UL-BWP can be reused in the SL-BWP.

In addition, when the SL-BWP and the UL-BWP are located on a same carrier, a frequency domain resource of the SL-BWP may alternatively have no intersection with a frequency domain resource of the UL-BWP.

In some embodiments, sidelink communication and uplink communication alternatively occur on independent carriers (shared carrier), and the SL-BWP and the UL-BWP do not overlap. That is, different resources are used on an SL and a UL.

In addition, in the example 3, when the network device configures resource pools, configuration information may further include at least one of the following information:

(1) Multiplexing format indication information of sidelink control information (SA) and sidelink data (2) Transmission mode in sidelink communication (2) Subcarrier spacing (SCS) indication information (3) Cyclic prefix (CP) indication information For a specific indication manner of the indication information, refer to related content in the example 1. Details are not described herein again.

Figure 19:
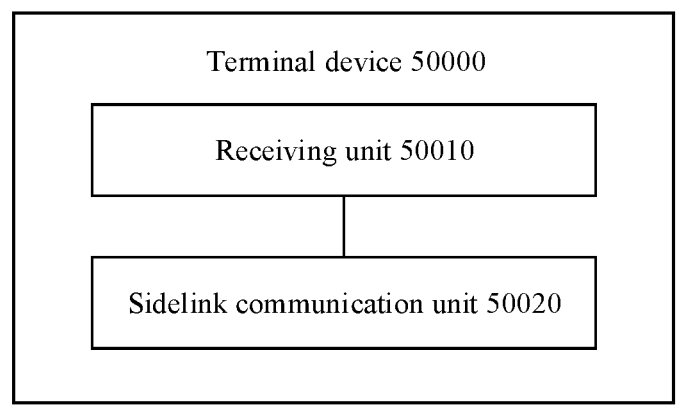
FIG. 19 is a schematic block diagram of a terminal device according to an embodiment of this application.

FIG. 19 is a schematic block diagram of a terminal device according to an embodiment of this application. The terminal device 50000 in FIG. 19 corresponds to the methods shown in FIG. 17 and FIG. 18. The terminal device 50000 can perform steps performed by the terminal device in the method shown in FIG. 17, and the terminal device 50000 may further perform steps performed by the terminal device 1 in the method shown in FIG. 18. Limitations and explanations of the steps in the sidelink communication methods in the embodiments of this application in FIG. 17 and FIG. 18 are also applicable to steps performed by the terminal device 50000 shown in FIG. 19. For brevity, repeated descriptions are appropriately omitted in the following description of the terminal device 50000 shown in FIG. 19.

The terminal device 50000 shown in FIG. 19 includes:

a receiving unit 50010, configured to receive sidelink BWP indication information sent by the network device, where the sidelink BWP indication information is used to indicate N sidelink bandwidth parts SL-BWPs, the N SL-BWPs are bandwidth parts BWPs used by the terminal device to perform sidelink communication, the N SL-BWPs include a common SL-BWP, and the common SL-BWP is a frequency domain resource that is configured by the network device for all terminal devices within coverage of the network device and that is to be used by all the terminal devices to perform sidelink communication; and a sidelink communication unit 50020, configured to perform sidelink communication with another terminal device in the N SL-BWPs.

In this application, the N SL-BWPs including the common SL-BWP are configured for the terminal device, so that the terminal device can perform sidelink communication with the another terminal device in the N SL-BWPs.

In some embodiments, in an embodiment, the receiving unit 50010 is further configured to receive sidelink BWP configuration information sent by the network device, where the sidelink BWP configuration information is used to configure M SL-BWPs for the terminal device, the M SL-BWPs are BWPs available for sidelink communication, and the N SL-BWPs belong to the M SL-BWPs, where M is a positive integer greater than or equal to N.

In some embodiments, in an embodiment, the receiving unit 50010 is further configured to receive uplink BWP indication information sent by the network device, where the uplink BWP indication information is used to indicate Y uplink bandwidth parts UL-BWPs, and Y is a positive integer.

The network device may flexibly configure sidelink resources based on a service type or another requirement, to improve system performance.

In some embodiments, in an embodiment, the Y UL-BWPs and the N SL-BWPs are located on a same carrier.

The UL-BWP and the SL-BWP are configured on the same carrier, so that utilization efficiency of spectrum resources can be improved.

In some embodiments, in an embodiment, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In some embodiments, in an embodiment, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In some embodiments, in an embodiment, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

The network device configures the multiplexing format, so that requirements in sidelink communication of different services of the terminal device can be met.

In some embodiments, in an embodiment, the sidelink BWP configuration information carries M pieces of multiplexing format indication information, the M pieces of multiplexing format indication information are in a one-to-one correspondence with the M SL-BWPs, any one piece of multiplexing format indication information is used to indicate a multiplexing format of sidelink data and sidelink control information that are sent when sidelink communication is performed by using an SL-BWP corresponding to the multiplexing format indication information, and the multiplexing format available for the sidelink data and the sidelink control information includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In some embodiments, the sidelink BWP configuration information carries M pieces of transmission mode information, the M pieces of transmission mode information are in a one-to-one correspondence with the M SL-BWPs, any one piece of transmission mode information is used to indicate a transmission mode of sidelink data and sidelink control information that are sent when sidelink communication is performed by using an SL-BWP corresponding to the transmission mode information, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the sidelink BWP configuration information carries M pieces of numerology information, the M pieces of numerology information are in a one-to-one correspondence with the M SL-BWPs, any one piece of numerology information is used to indicate a numerology of sidelink data and sidelink control information that are sent when sidelink communication is performed by using an SL-BWP corresponding to the numerology information, and the numerology includes a subcarrier spacing (subcarrier spacing, SCS) and a cyclic prefix (CP).

The network device may flexibly configure numerologies based on different requirements in sidelink communication, to further flexibly configure sidelink resources, thereby improving an effect of sidelink communication.

Figure 20:
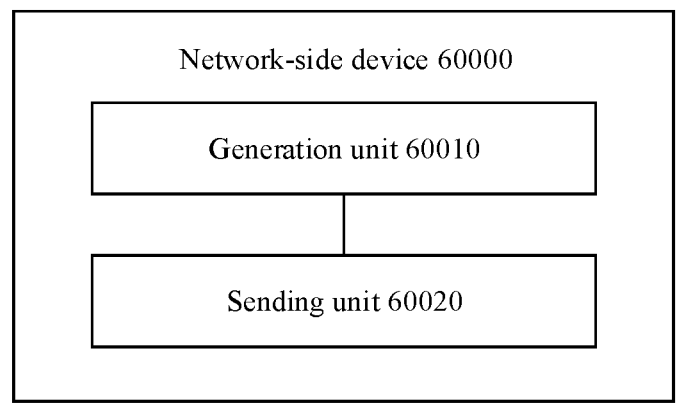
FIG. 20 is a schematic block diagram of a network device according to an embodiment of this application.

FIG. 20 is a schematic block diagram of a network device according to an embodiment of this application. The network device 60000 in FIG. 20 corresponds to the foregoing methods shown in FIG. 17 and FIG. 18. The network device 60000 can perform steps performed by the network device in the methods shown in FIG. 17 and FIG. 18.

It should be understood that, limitations and explanations of the steps in the sidelink communication methods in the embodiments of this application in FIG. 17 and FIG. 18 are also applicable to steps performed by the network device 60000 shown in FIG. 20. For brevity, repeated descriptions are appropriately omitted in the following description of the network device 60000 shown in FIG. 20.

The network device 60000 shown in FIG. 20 includes:

a generation unit 60010, configured to generate sidelink BWP indication information, where the sidelink BWP indication information is used to indicate N sidelink bandwidth parts SL-BWPs, the N SL-BWPs include a common SL-BWP, and the common SL-BWP is a frequency domain resource that is configured by the network device for all terminal devices within coverage of the network device and that is to be used by all the terminal devices to perform sidelink communication; and a sending unit 60020, configured to send the sidelink BWP indication information to a terminal device, where the N SL-BWPs are used by the terminal device to perform sidelink communication with another terminal device.

In this application, the network device configures the N SL-BWPs including the common SL-BWP for the terminal device, so that the terminal device can perform sidelink communication with the another terminal device in the N SL-BWPs.

In some embodiments, in an embodiment, the sending unit 60020 is further configured to send sidelink BWP configuration information to the terminal device, where the sidelink BWP configuration information is used to configure M SL-BWPs for the terminal device, the M SL-BWPs are BWPs available for sidelink communication, and the N SL-BWPs belong to the M SL-BWPs, where M is a positive integer greater than or equal to N.

In some embodiments, in an embodiment, the sending unit 60020 is further configured to send uplink BWP indication information to the terminal device, where the uplink BWP indication information is used to indicate Y uplink bandwidth parts UL-BWPs, and Y is a positive integer.

The network device may flexibly configure sidelink resources based on a service type or another requirement, to improve system performance.

In some embodiments, in an embodiment, the Y UL-BWPs and the N SL-BWPs are located on a same carrier.

The UL-BWP and the SL-BWP are configured on the same carrier, so that utilization efficiency of spectrum resources can be improved.

In some embodiments, in an embodiment, the Y UL-BWPs and the N SL-BWPs include a first frequency domain resource, the first frequency domain resource belongs to the Y UL-BWPs, and the first frequency domain resource belongs to the N SL-BWPs.

That is, the Y UL-BWPs and the N SL-BWPs include a same frequency domain resource (where there is an intersection between frequency domain resources of the Y UL-BWPs and frequency domain resources of the N SL-BWPs).

When the SL-BWP and the UL-BWP include the same frequency domain resource, some resources of the UL-BWP may be reused in the SL-BWP for sidelink communication, so that utilization efficiency of spectrum resources can be optimized.

In some embodiments, in an embodiment, the Y UL-BWPs and the N SL-BWPs do not include a same frequency domain resource.

Different frequency domain resources are configured for the UL-BWP and the SL-BWP, so that sidelink communication and uplink communication are independent of each other and do not interfere with each other.

In some embodiments, in an embodiment, the Y UL-BWPs and the N SL-BWPs are located on different carriers.

The UL-BWP and the SL-BWP are configured on different carriers, so that sidelink communication and uplink communication can be performed on the different carriers, thereby avoiding mutual interference between the sidelink communication and the uplink communication.

The network device configures the multiplexing format, so that requirements in sidelink communication of different services of the terminal device can be met.

In some embodiments, in an embodiment, the sidelink BWP configuration information carries M pieces of multiplexing format indication information, the M pieces of multiplexing format indication information are in a one-to-one correspondence with the M SL-BWPs, any one piece of multiplexing format indication information is used to indicate a multiplexing format of sidelink data and sidelink control information that are sent when sidelink communication is performed by using an SL-BWP corresponding to the multiplexing format indication information, and the multiplexing format available for the sidelink data and the sidelink control information includes frequency division multiplexing and time division multiplexing.

The network device configures the multiplexing format, so that requirements in sidelink communication of different services of the terminal device can be met.

For example, for a sidelink service having an ultra-low latency requirement, time division multiplexing may be configured for sidelink data and sidelink control information in a same slot (slot), and for a sidelink service having a high reliability requirement, frequency division multiplexing may be configured for sidelink data and sidelink control information in a same slot.

In some embodiments, the sidelink BWP configuration information carries M pieces of transmission mode information, the M pieces of transmission mode information are in a one-to-one correspondence with the M SL-BWPs, any one piece of transmission mode information is used to indicate a transmission mode of sidelink data and sidelink control information that are sent when sidelink communication is performed by using an SL-BWP corresponding to the transmission mode information, and the transmission mode includes unicast transmission (unicast), groupcast transmission (groupcast), and broadcast transmission (broadcast).

The network device can flexibly configure sidelink resources based on different requirements in sidelink communication, so that an effect of sidelink communication can be improved, and system performance can be improved.

In some embodiments, the sidelink BWP configuration information carries M pieces of numerology information, the M pieces of numerology information are in a one-to-one correspondence with the M SL-BWPs, any one piece of numerology information is used to indicate a numerology of sidelink data and sidelink control information that are sent when sidelink communication is performed by using an SL-BWP corresponding to the numerology information, and the numerology includes a subcarrier spacing (SCS) and a cyclic prefix (CP).

The network device may flexibly configure numerologies based on different requirements in sidelink communication, to further flexibly configure sidelink resources, thereby improving an effect of sidelink communication.

In addition, when the terminal device includes a memory, a transceiver, and a processor, the receiving unit 50010 in the terminal device 50000 is equivalent to the transceiver, and the sidelink communication unit 50020 is equivalent to the transceiver and the processor.

When the network device includes a memory, a transceiver, and a processor, the generation unit 60010 in the network device 60000 is equivalent to the processor, and the sending unit 60020 is equivalent to the transceiver.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sidelink communication method, comprising:
receiving, by a terminal device, resource configuration information sent by a network device, wherein the resource configuration information is for configuring a common resource for the terminal device, and the common resource is a resource that is configured by the network device for all terminal devices within coverage of the network device and that is to be used by all the terminal devices to perform sidelink communication;
receiving, by the terminal device, sidelink bandwidth parts (BWP) indication information sent by the network device, wherein the sidelink BWP indication information indicates N sidelink bandwidth parts (SL-BWPs), the N SL-BWPs are bandwidth parts BWPs used by the terminal device to perform sidelink communication, and the N SL-BWPs comprise a frequency domain resource corresponding to the common resource, wherein N is a positive integer; and
performing, by the terminal device, sidelink communication with another terminal device in the N SL-BWPs,
wherein the resource configuration information carries multiplexing format indication information, the multiplexing format indication information indicates a multiplexing format of sidelink data and sidelink control information that are sent by the terminal device when the terminal device performs sidelink communication on the common resource.

2. The method according to claim 1, wherein the method further comprises:
receiving, by the terminal device, sidelink BWP configuration information sent by the network device, wherein the sidelink BWP configuration information is for configuring M SL-BWPs for the terminal device, the M SL-BWPs are BWPs available for sidelink communication, and the N SL-BWPs belong to the M SL-BWPs, wherein M is a positive integer greater than or equal to N.

3. The method according to claim 1, wherein the method further comprises:
receiving, by the terminal device, uplink BWP indication information sent by the network device, wherein the uplink BWP indication information indicates Y uplink bandwidth parts (UL-BWPs), and Y is a positive integer.

4. The method according to claim 3, wherein the Y UL-BWPs and the N SL-BWPs are located on a same carrier.

5. The method according to claim 3, wherein the Y UL-BWPs and the N SL-BWPs are located on different carriers.

6. The method according to claim 1, wherein the multiplexing format comprises frequency division multiplexing and time division multiplexing.

7. A sidelink communication method, comprising:
receiving, by a terminal device, resource configuration information sent by a network device, wherein the resource configuration information is for configuring a common resource for the terminal device, and the common resource is a resource that is configured by the network device for all terminal devices within coverage of the network device and that is to be used by all the terminal devices to perform sidelink communication:
receiving, by the terminal device, sidelink bandwidth parts (BWP) indication information sent by the network device, wherein the sidelink BWP indication information indicates N sidelink bandwidth parts (SL-BWPs), the N SL-BWPs are bandwidth parts BWPs used by the terminal device to perform sidelink communication, and the N SL-BWPs comprise a frequency domain resource corresponding to the common resource, wherein N is a positive integer;
receiving, by the terminal device, uplink BWP indication information sent by the network device, wherein the uplink BWP indication information indicates Y uplink bandwidth parts (UL-BWPs), and Y is a positive integer;
performing, by the terminal device, sidelink communication with another terminal device in the N SL-BWPs; wherein
the Y UL-BWPs and the N SL-BWPs are located on a same carrier; and
the Y UL-BWPs and the N SL-BWPs comprise a first frequency domain resource, the first frequency domain resource belongs to the Y UL-BWPs, and the first frequency domain resource belongs to the N SL-BWPs.

8. A sidelink communication method comprising:
receiving, by a terminal device, resource configuration information sent by a network device, wherein the resource configuration information is for configuring a common resource for the terminal device, and the common resource is a resource that is configured by the network device for all terminal devices within coverage of the network device and that is to be used by all the terminal devices to perform sidelink communication,
receiving, by the terminal device, sidelink bandwidth parts (BWP) indication information sent by the network device, wherein the sidelink BWP indication information indicates N sidelink bandwidth parts (SL-BWPs), the N SL-BWPs are bandwidth parts BWPs used by the terminal device to perform sidelink communication, and the N SL-BWPs comprise a frequency domain resource corresponding to the common resource, wherein N is a positive integer;
receiving, by the terminal device, uplink BWP indication information sent by the network device, wherein the uplink BWP indication information indicates Y uplink bandwidth parts (UL-BWPs), and Y is a positive integer;
performing, by the terminal device, sidelink communication with another terminal device in the N SL-BWPs, wherein
the Y UL-BWPs and the N SL-BWPs are located on a same carrier, and
the Y UL-BWPs and the N SL-BWPs do not comprise a same frequency domain resource.

9. A sidelink communication method, comprising:
sending, by a network device, resource configuration information to a terminal device, wherein the resource configuration information is for configuring a common resource for the terminal device, and the common resource is a resource that is configured by the network device for all terminal devices within coverage of the network device and that is to be used by all the terminal devices to perform sidelink communication; and
sending, by the network device, sidelink bandwidth parts (BWP) indication information to the terminal device, wherein the sidelink BWP indication information is used to indicate N sidelink bandwidth parts (SL-BWPs), the N SL-BWPs comprise a frequency domain resource corresponding to the common resource, and the N SL-BWPs are used by the terminal device to perform sidelink communication with another terminal device, wherein N is a positive integer;
wherein the resource configuration information carries multiplexing format indication information, the multiplexing format indication information indicates a multiplexing format of sidelink data and sidelink control information that are sent by the terminal device when the terminal device performs sidelink communication on the common resource.

10. The method according to claim 9, wherein the method further comprises:
sending, by the network device, sidelink BWP configuration information to the terminal device, wherein the sidelink BWP configuration information is for configuring M SL-BWPs for the terminal device, the M SL-BWPs are BWPs available for sidelink communication, and the N SL-BWPs belong to the M SL-BWPs, wherein M is a positive integer greater than or equal to N.

11. The method according to claim 9, wherein the method further comprises:
sending, by the network device, uplink BWP indication information to the terminal device, wherein the uplink BWP indication information indicates Y uplink bandwidth parts (UL-BWPs), and Y is a positive integer.

12. The method according to claim 11, wherein the Y UL-BWPs and the N SL-BWPs are located on a same carrier.

13. The method according to claim 12, wherein the Y UL-BWPs and the N SL-BWPs comprise a first frequency domain resource, the first frequency domain resource belongs to the Y UL-BWPs, and the first frequency domain resource belongs to the N SL-BWPs.

14. The method according to claim 12, wherein the Y UL-BWPs and the N SL-BWPs do not comprise a same frequency domain resource.

15. A terminal device, comprising:
a receiving unit, configured to receive resource configuration information sent by a network device, wherein the resource configuration information is for configuring a common resource for the terminal device, and the common resource is a resource that is configured by the network device for all terminal devices within coverage of the network device and that is to be used by all the terminal devices to perform sidelink communication, wherein
the receiving unit is further configured to receive sidelink bandwidth parts (BWP) indication information sent by the network device, wherein the sidelink BWP indication information is used to indicate N sidelink bandwidth parts (SL-BWPs), the N SL-BWPs are bandwidth parts (BWPs) used by the terminal device to perform sidelink communication, and the N SL-BWPs comprise a frequency domain resource corresponding to the common resource, wherein N is a positive integer; and
a sidelink communication unit, configured to perform sidelink communication with another terminal device in the N SL-BWPs;
wherein the resource configuration information carries multiplexing format indication information, the multiplexing format indication information indicates a multiplexing format of sidelink data and sidelink control information that are sent by the terminal device when the terminal device performs sidelink communication on the common resource.

16. The terminal device according to claim 15, wherein the receiving unit is further configured to:
receive sidelink BWP configuration information sent by the network device, wherein the sidelink BWP configuration information is for configuring M SL-BWPs for the terminal device, the M SL-BWPs are BWPs available for sidelink communication, and the N SL-BWPs belong to the M SL-BWPs, wherein M is a positive integer greater than or equal to N.

17. The terminal device according to claim 15, wherein the receiving unit is further configured to:
receive uplink BWP indication information sent by the network device, wherein the uplink BWP indication information is used to indicate Y uplink bandwidth parts UL-BWPs, and Y is a positive integer.

18. The terminal device according to claim 17, wherein the Y UL-BWPs and the N SL-BWPs are located on a same carrier.

19. The terminal device according to claim 17, wherein the Y UL-BWPs and the N SL-BWPs are located on different carriers.

20. The terminal device according to claim 15, wherein the multiplexing format comprises frequency division multiplexing and time division multiplexing.

21. A terminal device comprising:
a receiving unit, configured to receive resource configuration information sent by a network device, wherein the resource configuration information is for configuring a common resource for the terminal device, and the common resource is a resource that is configured by the network device for all terminal devices within coverage of the network device and that is to be used by all the terminal devices to perform sidelink communication, wherein
the receiving unit is further configured to receive sidelink bandwidth parts (BWP) indication information sent by the network device, wherein the sidelink BWP indication information is used to indicate N sidelink bandwidth parts (SL-BWPs), the N SL-BWPs are bandwidth parts (BWPs) used by the terminal device to perform sidelink communication, and the N SL-BWPs comprise a frequency domain resource corresponding to the common resource, wherein N is a positive integer; and
a sidelink communication unit, configured to perform sidelink communication with another terminal device in the N SL-BWPs, wherein
the receiving unit is further configured to; receive uplink BWP indication information sent by the network device, wherein the uplink BWP indication information is used to indicate Y uplink bandwidth parts UL-BWPs, and Y is a positive integer;
the Y UL-BWPs and the N SL-BWPs are located on a same carrier; and
the Y UL-BWPs and the N SL-BWPs comprise a first frequency domain resource, the first frequency domain resource belongs to the Y UL-BWPs, and the first frequency domain resource belongs to the N SL-BWPs.

22. A terminal device comprising
a receiving unit, configured to receive resource configuration information sent by a network device, wherein the resource configuration information is for configuring a common resource for the terminal device, and the common resource is a resource that is configured by the network device for all terminal devices within coverage of the network device and that is to be used by all the terminal devices to perform sidelink communication, wherein
the receiving unit is further configured to receive sidelink bandwidth parts (BWP) indication information sent by the network device, wherein the sidelink BWP indication information is used to indicate N sidelink bandwidth parts (SL-BWPs), the N SL-BWPs are bandwidth parts (BWPs) used by the terminal device to perform sidelink communication, and the N SL-BWPs comprise a frequency domain resource corresponding to the common resource, wherein N is a positive integer; and
a sidelink communication unit, configured to perform sidelink communication with another terminal device in the N SL-BWPs; wherein:
the receiving unit is further configured to; receive uplink BWP indication information sent by the network device, wherein the uplink BWP indication information is used to indicate Y uplink bandwidth parts UL-BWPs, and Y is a positive integer,
the Y UL-BWPs and the N SL-BWPs are located on a same carrier; and
the Y UL-BWPs and the N SL-BWPs do not comprise a same frequency domain resource.

* * * * *